US011277255B2

(12) United States Patent
Satpathy et al.

(10) Patent No.: US 11,277,255 B2
(45) Date of Patent: Mar. 15, 2022

(54) SWAPPING OF ENCRYPTION AND DECRYPTION OPERATIONS FOR SIDE CHANNEL ATTACK PROTECTION

(71) Applicant: Facebook Technologies, LLC, Menlo Park, CA (US)

(72) Inventors: Sudhir Satpathy, Redmond, WA (US); Wojciech Stefan Powiertowski, Kirkland, WA (US); Neeraj Upasani, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 100 days.

(21) Appl. No.: 16/779,007

(22) Filed: Jan. 31, 2020

(65) Prior Publication Data
US 2021/0184830 A1 Jun. 17, 2021

Related U.S. Application Data

(60) Provisional application No. 62/946,749, filed on Dec. 11, 2019.

(51) Int. Cl.
*H04L 9/00* (2006.01)
*H04L 9/06* (2006.01)
(Continued)

(52) U.S. Cl.
CPC ............ *H04L 9/002* (2013.01); *G06F 3/011* (2013.01); *H04L 9/0631* (2013.01);
(Continued)

(58) Field of Classification Search
CPC ... H04L 9/003; H04L 9/0631; G06F 15/7807; H04N 13/332
See application file for complete search history.

(56) References Cited

U.S. PATENT DOCUMENTS

| 8,346,839 | B2* | 1/2013 | Ozturk | G06F 9/30007 |
| | | | | 708/620 |
| 2003/0223580 | A1* | 12/2003 | Snell | H04L 9/0631 |
| | | | | 380/28 |

(Continued)

OTHER PUBLICATIONS

"SMS4 Encryption Algorithm for Wireless Networks"—Whitfield Diffie, Sun Microsystems, George Ledin, Sonoma State University, May 15, 2008 https://eprint.iacr.org/2008/329.pdf (Year: 2008).*

(Continued)

*Primary Examiner* — Randy A Scott
(74) *Attorney, Agent, or Firm* — Shumaker & Sieffert, P.A.

(57) ABSTRACT

This disclosure describes systems on a chip (SOCs) that prevent side channel attacks (SCAs). The SoCs of this disclosure concurrently operate multi-round encryption and decryption datapaths according to a combined sequence of encryption rounds and decryption rounds. An example SoC of this disclosure includes an engine configured to encrypt transmission (Tx) channel data using a multi-round encryption datapath, and to decrypt encrypted received (Rx) channel data using a multi-round decryption datapath. The SoC further includes a security processor configured to multiplex the multi-round encryption datapath against the multi-round decryption datapath on a round-by-round basis to generate a mixed sequence of encryption rounds and decryption rounds, and to control the engine to encrypt the Tx channel data and decrypt the encrypted Rx channel data according to the mixed sequence of encryption rounds and decryption rounds.

20 Claims, 11 Drawing Sheets

(51) Int. Cl.
H04L 29/06 (2006.01)
G06F 3/01 (2006.01)

(52) U.S. Cl.
CPC ......... H04L 63/0428 (2013.01); *H04L 9/003* (2013.01); *H04L 2209/04* (2013.01)

(56) References Cited

U.S. PATENT DOCUMENTS

2014/0351896 A1* 11/2014 Koo ................ G02B 27/017
                                                                    726/4
2018/0150831 A1*  5/2018 Dolan ............... G06Q 20/367

OTHER PUBLICATIONS

"Specification of Camellia—A 128-bit Block Cipher"—Aoki et al, Nippon Telegraph and Telephone Corporation, Mitsubishi Electric Corporation, Sep. 26, 2001 https://www.cryptrec.go.jp/en/cryptrec_03_spec_cypherlist_files/PDF/06_01espec.pdf (Year: 2001).*

"Announcing the Advanced Encryption Standard (AES)," Federal Information Processing Standards Publication 197, Nov. 26, 2001, 51 pp.

"SMS4 Encryption Algorithm for Wireless Networks," Version 1.03, May 15, 2008, 6 pp. (translated by Diffie et al.).

Aoki et al., "Specification of Camellia—a 128-bit Block Cipher," NTT and Mitsubishi Electric Corporation, Sep. 26, 2001, 35 pp.

U.S. Appl. No. 16/721,701, filed Dec. 19, 2019, naming inventors Satpathy et al.

U.S. Appl. No. 16/506,618, filed Jul. 9, 2019, naming inventors Atlas et al.

* cited by examiner

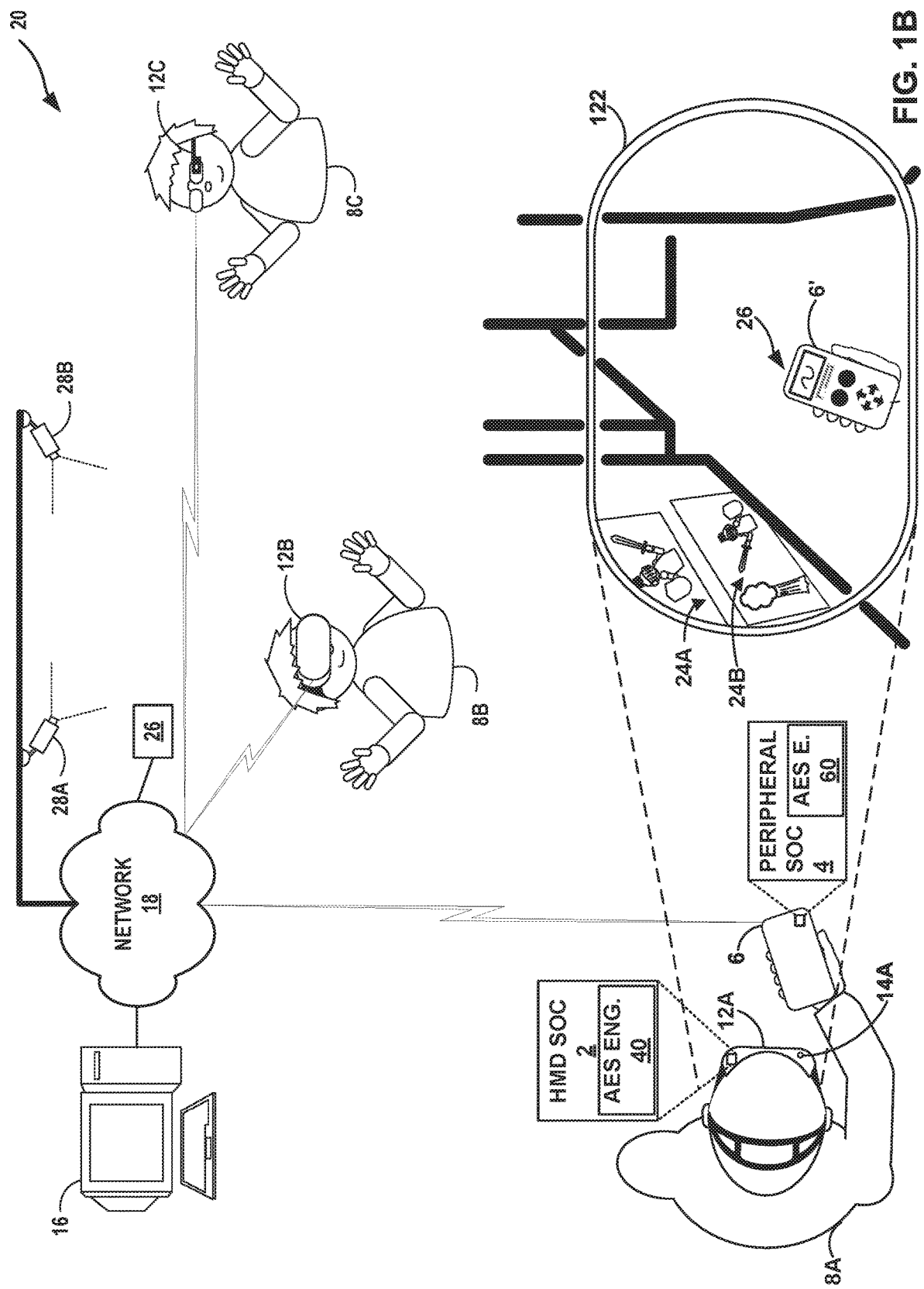

SWAPPING OF ENCRYPTION AND DECRYPTION OPERATIONS FOR SIDE CHANNEL ATTACK PROTECTION

This application claims the benefit of U.S. Provisional Patent Application No. 62/946,749 filed on 11 Dec. 2019, the entire contents of which are incorporated by reference herein.

TECHNICAL FIELD

This disclosure generally relates to data encryption and decryption implemented in various types of computing systems.

BACKGROUND

Many computing systems incorporate content protection or digital rights management technology that includes data encryption and decryption hardware and software. This encryption protects secure data, which is potentially sensitive, private, and/or right-managed and is stored or used on the system, from unauthorized access and exploitation. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g. wirelessly or in tethered fashion) to a peripheral device that performs one or more artificial reality-related functions.

SUMMARY

Some devices that perform encryption and/or decryption are standalone devices that are relatively portable and battery-powered. These features make these devices relatively vulnerable to attack or snooping mechanisms that rely on gleaning information about the hardware functioning of these devices. An example of such an attack mechanism is a so-called "side channel attack" or SCA. SCAs exploit one or more of timing information, current (flow of charge) information, power consumption data, electromagnetic traces and leaks, emitted sounds, etc. In some examples, devices that perform encryption and/or decryption are incorporated into artificial reality systems. Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. Some artificial reality systems incorporate a head-mounted display (HMD) and a peripheral device that are communicatively coupled and function as co-processing devices within the artificial reality system. The HMD is typically worn by a user and configured to output artificial reality content to the user. The peripheral device typically has a form factor similar to that of a handheld mobile computing device, such as a smartphone or personal digital assistant (PDA), and is held in the user's hand. Artificial reality content may represent completely generated content, or a combination of generated content with captured content (e.g., real-world video and/or images).

For portability and other reasons, user-facing artificial reality modalities (e.g., HMDs) and co-processing devices (e.g., peripheral devices in communication with HMDs) are battery-powered, and are therefore often designed for low-power operation. The low-power designs and portable form factors of HMDs and peripheral devices make these devices particularly vulnerable to SCAs, which are often performed using non-invasive, accessible, and relatively cheap off-the-shelf hacking equipment, such as SCA boards, trace analysis software, etc.

In general, this disclosure describes HMDs and peripheral devices that include a combined encryption/decryption engine (an "integrated engine" or "hybrid engine") configured to perform the overall combination of encryption and decryption in an SCA-resistant manner. The hybrid engine performs encryption and decryption using multi-round datapaths, in that encryption and decryption are each performed in an iterative way such that the results from one round of computations are fed back into the datapath to be used in the subsequent round of computations. In some examples, control logic of this disclosure causes the hybrid engine to switch between operating an encryption round and operating a decryption round within a multi-round datapath operated by the hybrid encryption/decryption engine. Control logic of this disclosure may control the hybrid engine to generate a mixed sequence of encryption rounds and decryption rounds on a random basis, a pseudo-random basis, a deterministic basis, or in other ways that yield a mixed sequence of encryption rounds and decryption rounds.

For example, control logic of this disclosure may multiplex encryption and decryption operations of the hybrid engine on a per-round basis such that encryption rounds and decryption rounds are executed on a staggered and interleaved basis. By varying selection inputs provided to the multiplexer logic, the control logic of this disclosure generates a mixed sequence of encryption rounds and decryption rounds. Again, the control logic may provide selection inputs to the multiplexer logic on a random, pseudo-random, deterministic, or other basis to generate the overall mixed sequences of encryption rounds and decryption rounds. In this way, a subset of rounds of a multi-round encryption datapath are randomly interleaved with a subset of rounds of a multi-round decryption datapath.

In some examples, assuming that the hybrid engine has data for both encryption and decryption available concurrently, the hybrid engine activates SCA-mitigation logic while executing rounds for one, but not both, of the encryption datapath or the decryption datapath. In other examples, the hybrid engine activates SCA-mitigation logic while executing a subset of rounds on the encryption datapath and while executing a subset of rounds on the decryption datapath. By randomly interleaving SCA-protected rounds with non-SCA-protected rounds, the hybrid engine of this disclosure obfuscates the overall power trace signature exhibited by the device by way of the subset of SCA-protected rounds being interspersed, thereby scrambling the overall attack surface exposed to SCA equipment.

This disclosure focuses on encryption and decryption in the context of encrypted data communications between an HMD and peripheral device of an artificial reality system. However, it will be appreciated that the technical improvements of the configurations described in this disclosure may be incorporated into other types of systems that perform encryption and decryption, as well.

In one example, this disclosure is directed to an SoC that includes an engine and a security processor. The engine is configured to encrypt transmission (Tx) channel data using a multi-round encryption datapath, and to decrypt encrypted received (Rx) channel data using a multi-round decryption datapath. The security processor is configured to multiplex the multi-round encryption datapath against the multi-round decryption datapath on a round-by-round basis to generate a mixed sequence of encryption rounds and decryption rounds, and to control the engine to encrypt the Tx channel data and decrypt the encrypted Rx channel data according to the mixed sequence of encryption rounds and decryption rounds.

In another example, this disclosure is directed to an HMID that includes an SoC and an interface coupled to the SoC. The SoC includes an engine and a security processor. The engine is configured to encrypt transmission (Tx) channel data using a multi-round encryption datapath, and to decrypt encrypted received (Rx) channel data using a multi-round decryption datapath. The security processor is configured to multiplex the multi-round encryption datapath against the multi-round decryption datapath on a round-by-round basis to generate a mixed sequence of encryption rounds and decryption rounds, and to control the engine to encrypt the Tx channel data and decrypt the encrypted Rx channel data according to the mixed sequence of encryption rounds and decryption rounds. The interface is configured to transmit the Tx traffic, and to receive the encrypted Rx traffic.

In another example, this disclosure is directed to a peripheral device that includes an SoC and an interface coupled to the SoC. The SoC includes an engine and a security processor. The engine is configured to encrypt transmission (Tx) channel data using a multi-round encryption datapath, and to decrypt encrypted received (Rx) channel data using a multi-round decryption datapath. The security processor is configured to multiplex the multi-round encryption datapath against the multi-round decryption datapath on a round-by-round basis to generate a mixed sequence of encryption rounds and decryption rounds, and to control the engine to encrypt the Tx channel data and decrypt the encrypted Rx channel data according to the mixed sequence of encryption rounds and decryption rounds. The interface is configured to transmit the Tx traffic, and to receive the encrypted Rx traffic.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 1B is an illustration depicting another example artificial reality system that includes components configured to implement the SCA-prevention techniques of this disclosure.

DETAILED DESCRIPTION

Figure 1A:
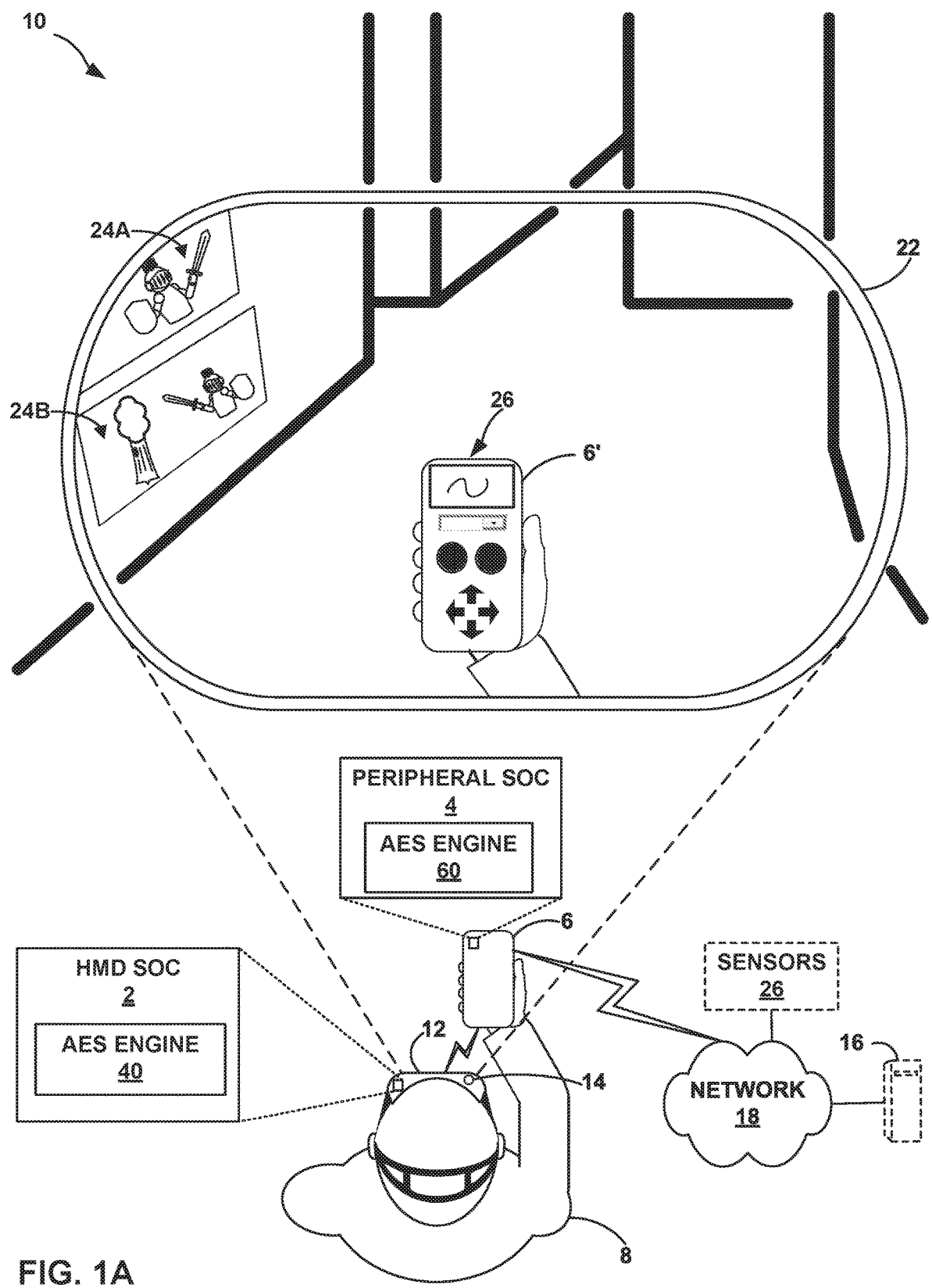
FIG. 1A is an illustration depicting an example multi-device artificial reality system of this disclosure, components of which are configured to thwart SCAs by encrypting input data and decrypting encrypted digital content in accordance with aspects of this disclosure.

Multi-device systems sometimes incorporate content protection or digital rights management technology, such as data encryption and decryption, as part of in-system, inter-device communications. A source device that originates an encrypted communication within the system may implement digital data encryption according to various standardized encryption mechanisms. A destination device that receives the encrypted communication for processing beyond simple relaying performs generally reciprocal or "inverse" steps with respect to the encryption mechanisms, in accordance with the inverse steps specified in the corresponding standard according to which the data was encrypted.

Encrypted inter-device communications are often performed in a packetized manner. The packetized communications are packaged as discrete data units (or "packets"), with each packet conforming to a format/structure. Packets of an inter-device encrypted data flow are referred to herein as "crypto packets." Each crypto packet conforms to a format in which an encrypted payload is encapsulated within an "encryption header." Various non-limiting examples of this disclosure are described with respect to peer-to-peer (P2P) unicast data flows between two devices of multi-device artificial reality systems.

Artificial reality systems are becoming increasingly ubiquitous with applications in many fields such as computer gaming, health and safety, industrial fields, and education. As a few examples, artificial reality systems are being incorporated into mobile devices, gaming consoles, personal computers, movie theaters, and theme parks. In general, artificial reality is a form of reality that has been adjusted in some manner before presentation to a user, and may include one or more of virtual reality (VR), augmented reality (AR), mixed reality (MR), hybrid reality, or some combination and/or derivative thereof.

Typical artificial reality systems include one or more devices for rendering and displaying content to users. As one example, a multi-device artificial reality system of this disclosure may include a head-mounted device (HMD) worn by a user and configured to output artificial reality content to the user, and a peripheral device that operates as a co-processing device when paired with the HMD. The artificial reality content may include completely generated content or generated content combined with captured content (e.g., real-world video and/or real-world images). The peripheral device and the HMD may each include one or more SoC integrated circuits (referred to herein simply as "SoCs") that are collectively configured to provide an artificial reality application execution environment.

Typical artificial reality systems include one or more devices for rendering and displaying content to users. As one example, an artificial reality system may incorporate a head-mounted device (HMD) worn by a user and configured to output artificial reality content to the user. In some artificial reality systems, the HMD is communicatively coupled to a peripheral device, which may, in some examples, have a form factor similar to those of common handheld devices, such as a smartphone. The artificial reality content may include completely generated content or generated content combined with captured content (e.g., real-world video and/or real-world images). Many components of artificial reality systems, such as HMDs and peripheral devices, are battery powered. In these examples, HMDs and peripheral devices tend to be designed for low-power operation. The low-power designs and portable nature of HMDs and peripheral devices make HMDs and peripheral devices particularly vulnerable to SCAs. SCAs are often performed using non-invasive, accessible, and relatively cheap off-the-shelf hacking equipment, such as SCA boards, trace analysis software, etc.

FIG. 1A is an illustration depicting an example multi-device artificial reality system 10, components of which are configured to thwart SCAs by encrypting input data and decrypting encrypted digital content in accordance with aspects of this disclosure. Components of multi-device artificial reality system 10, such as head-mounted device worn by a user and/or a peripheral device that functions as a co-processing device with the head-mounted device, are configured to cross-obfuscate encryption-based and decryption-based power trace signatures during randomly interleaved rounds of a multi-round encryption datapath and a multi-round decryption datapath, with only one of the two datapaths featuring or being otherwise protected by activated SCA-mitigation logic. The head-mounted device and/or the peripheral device of multi-device artificial reality system 10 may incorporate a hybrid engine that is configured to randomly interleave SCA-protected rounds and non-SCA protected rounds of the encryption datapath and/or decryption datapath in accordance with aspects of this disclosure.

By randomly interleaving SCA-protected rounds with non-SCA-protected rounds in this way, the components of multi-device artificial reality system 10 extend the protections of the activated SCA-mitigation logic even to those rounds for which the SCA-mitigation logic is deactivated. That is, control logic of this disclosure intersperses the overall power trace signature exhibited by the device into which the hybrid engine is integrated with SCA-protected and non-SCA-protected power trace information. In this way, the techniques of this disclosure provide SCA protection to both the encryption and decryption datapaths implemented by the hybrid engine, while expending SCA-mitigation resource costs corresponding to only one of the two datapaths. In these examples, the overall power trace signature output by the individual component(s) of multi-device artificial reality system 10 is scrambled due to the protection of the activated SCA-mitigation logic being interspersed throughout the overall power trace signature.

Multi-device artificial reality system 10 includes a head-mounted device (HMD) 12 and a peripheral device 6. As shown, HMD 12 is typically worn by a user 8. HMD 12 typically includes an electronic display and optical assembly for presenting artificial reality content 22 to user 8. In addition, NID 12 includes one or more sensors (e.g., accelerometers) for tracking motion of HMD 12. HMD 12 may include one or more image capture devices 14, e.g., cameras, line scanners, fundal photography hardware, or the like. Image capture devices 14 may be configured for capturing image data of the surrounding physical environment. In some examples, image capture devices 14 include inward-facing camera hardware and/or scanning hardware configured to capture facial images, retina scans, iris scans, etc. of user 8 for user authentication and for other purposes.

HMD 12 is shown in this example as being in communication with (e.g., in wireless communication with or tethered to) peripheral device 6. Peripheral device 6 represents a co-processing device in communication with HMD 12. HMD 12 and/or peripheral device 6 may execute an artificial reality application to construct artificial reality content 22 for display to user 8. For example, HMD 12 and/or peripheral device 6 may construct the artificial reality content based on tracking pose information and computing pose information for a frame of reference, typically a viewing perspective of HMD 12.

As shown in FIG. 1A, one or more devices of multi-device artificial reality system 10 may be connected to a computing network, such as network 18. Network 18 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards. Network 18 may support various levels of network access, such as to public networks (e.g., the Internet), to private networks (e.g., as may be implemented by educational institutions, enterprises, governmental agencies, etc.), or private networks implemented using the infrastructure of a public network (e.g., a virtual private network or "VPN" that is tunneled over the Internet).

FIG. 1A also illustrates various optional devices that may be included in multi-device artificial reality system 10 or coupled to multi-device artificial reality system 10 via network 18. The optional nature of these devices is shown in FIG. 1A by way of dashed-line borders. One example of an optional device shown in FIG. 1A is console 16. In implementations that include console 16, console 16 may communicate directly with HMD 12, and/or with peripheral device 6 (and thereby, indirectly with HMD 12) to process artificial reality content that HMD 12 outputs to user 8. Another example of optional hardware shown in FIG. 1A is represented by external sensors 26. Multi-device artificial reality system 10 may use external sensors 26 and/or external camera hardware to capture three-dimensional (3D) information within the real-world, physical environment at which user 8 is positioned.

In general, multi-device artificial reality system 10 uses information captured from a real-world, 3D physical environment to render artificial reality content 22 for display to user 8. In the example of FIG. 1A, user 8 views the artificial reality content 22 constructed and rendered by an artificial reality application executing on the combination of HMD 12 peripheral device 6. In some examples, artificial reality content 22 may comprise a combination of real-world imagery (e.g., peripheral device 6 in the form of peripheral device representation 6', representations of walls at the physical environment at which user 8 is presently positioned, a representation of the hand with which user 8 holds peripheral device 6, etc.) overlaid with virtual objects (e.g., virtual content items 24A and 24B, virtual user interface 26, etc.) to produce an augmented reality experience or a mixed reality experience displayed to user 8 via display hardware of HMD 12.

In some examples, virtual content items 24A and 24B (collectively, virtual content items 24) may be mapped to a particular position within artificial reality content 22. As examples, virtual content items 24 may be pinned, locked, or placed to/at certain position(s) within artificial reality content 22. A position for a virtual content item may be fixed, as relative to one of the walls of the real-world imagery reproduced in artificial reality content 22, or to the earth, as examples. A position for a virtual content item may be variable, as relative to peripheral device representation 6' or to the tracked gaze or field of view (FoV) of user 8, as non-limiting examples. In some examples, the particular position of a virtual content item within artificial reality content 22 is associated with a position within the real-world, physical environment (e.g., on a surface of a physical object) at which user 8 is positioned presently.

In this example, peripheral device 6 is a physical, real-world device having a surface on which the artificial reality application executing on computing platforms of multi-device artificial reality system 10 overlays virtual user interface 26. Peripheral device 6 may include one or more presence-sensitive surfaces for detecting user inputs by detecting a presence of one or more objects (e.g., fingers, stylus) touching or hovering over locations of the presence-sensitive surface. In some examples, peripheral device 6 may include one or more output devices, such as a display integrated into the presence-sensitive surface to form an input/output (I/O) component of peripheral device 6.

In some examples, peripheral device 6 may have the form factor of various portable devices, such as a smartphone, a tablet computer, personal digital assistant (PDA), or other handheld device. In other examples, peripheral device 6 may have the form factor of various wearable devices, such as a so-called "smartwatch," "smart ring," or other wearable device. In some examples, peripheral device 6 may be part of a kiosk or other stationary or mobile system. While described above as integrating display hardware, peripheral device 6 need not include display hardware in all implementations.

In the example artificial reality experience shown in FIG. 1A, virtual content items 24 are mapped to positions on a visual representation of a wall of the real-world physical environment at which user 8 is positioned. The example in FIG. 1A also shows that virtual content items 24 partially appear on the visual representation of the wall only within artificial reality content 22, illustrating that virtual content items 24 do not represent any items that exist in the real-world, physical environment at which user 8 is positioned. Virtual user interface 26 is mapped to a surface of peripheral device 6 as represented in peripheral device representation 6'. Multi-device artificial reality system 10 renders virtual user interface 26 for display via MID 12 as part of artificial reality content 22, at a user interface position that is locked relative to the position of a particular surface of peripheral device 6.

FIG. 1A shows that virtual user interface 26 appears overlaid on peripheral device representation 6' (and therefore, only within artificial reality content 22), illustrating that the virtual content represented in virtual user interface 26 does not exist in the real-world, physical environment at which user 8 is positioned. Multi-device artificial reality system 10 may render one or more virtual content items in response to a determination that at least a portion of the location of virtual content items is in the FoV of user 8. For example, multi-device artificial reality system 10 may render virtual user interface 26 on peripheral device 6 only if peripheral device 6 is within the FoV of user 8.

Various devices of multi-device artificial reality system 10 may operate in conjunction in the artificial reality environment, such that each device may be a separate physical electronic device and/or separate integrated circuits within one or more physical devices. In this example, peripheral device 6 is operationally paired with HMD 12 to jointly operate to provide an artificial reality experience. For example, peripheral device 6 and HMD 12 may communicate with each other as co-processing devices. As one example, when a user performs a user interface-triggering gesture in the virtual environment at a location that corresponds to one of the virtual user interface elements of virtual user interface 26 overlaid on peripheral device representation 6', multi-device artificial reality system 10 detects the user interface and performs an action that is rendered and displayed via HMD 12.

Each of peripheral device 6 and HMD 12 may include one or more SoC integrated circuits configured to support aspects of the artificial reality application described above, such as SoCs operating as co-application processors, encryption engines, decryption engines, sensor aggregators, display controllers, etc. Although each of peripheral device 6 and HMD 12 may include multiple SoCs, FIG. 1A only illustrates HMD SoC 2 of HMD 12 and peripheral SoC 4 of peripheral device 6, for ease of illustration and discussion. To preserve security and digital rights, HMD SoC 2 and peripheral SoC 4 are configured to communicate with one another using encrypted data streams, such as by sending crypto packet flows over a wireless link formed using respective peripheral component interface (PCI) express (PCIe) buses of HMD SoC 2 of HMD 12 and peripheral SoC 4.

To encrypt egress data before transmission to peripheral SoC 4 and to decrypt ingress data after receipt from peripheral SoC 4, HMD SoC 2 invokes AES engine 40. To encrypt egress data before transmission to HMD SoC 2 and to decrypt ingress data after receipt from HMD SoC 2, peripheral SoC 4 invokes AES engine 60. As one example, HMD SoC 2 may encrypt facial images, retina scans, iris scans, etc. of user 8 (e.g., as captured by inward-facing camera hardware and/or fundal photography hardware of image capture devices 14), and send the encrypted data to peripheral SoC 4 for authentication purposes and optionally, for other purposes as well. In this example, peripheral SoC 4 may decrypt the encrypted data received from HMD SoC 2, and process the decrypted data using facial recognition technology, retinal blood vessel pattern recognition technology, etc. to grant/deny biometric authentication to user 8. AES engine 40 represents a hybrid engine configured to perform encryption and decryption operations within an integrated silicon hardware infrastructure, in accordance with aspects of this disclosure. AES engine 60 represents another hybrid engine configured to perform encryption and decryption operations within an integrated silicon hardware infrastructure, in accordance with aspects of this disclosure.

AES engines 40, 60 are described herein as performing encryption and decryption operations that comply with the standardized encryption and decryption mechanisms described in the advanced encryption standard (AES) established by the United States National Institute of Standards and Technology (NIST) as a non-limiting example. It will be appreciated that HMD SoC 2 and peripheral SoC 4 may, in other examples, include encryption engines and decryption engine that implement the SCA-resistance enhancements of this disclosure while complying with other cipher standards, such as SM4 (formerly SMS4, a block cipher standard set forth in the Chinese National Standard for Wireless LAN WAPI), Camellia (developed by Mitsubishi Electric and NTT Corporation of Japan), etc. The techniques of this disclosure can be implemented in digital logic, and are therefore sufficiently scalable and polymorphic to provide SCA resistance within the compliance boundaries of various types of encryption and decryption engines, such as those that comply with the standards listed above and other standardized or non-standardized decryption engines.

While the SCA resistance-enhancing techniques of this disclosure are described with respect to being implemented within multi-device artificial reality system 10 as an example, it will be appreciated that the applicability of the techniques of this disclosure are not limited to artificial reality systems. The data communication techniques of this disclosure can also be implemented to improve data security in other types of computing devices, including, but not limited to, various types of battery-powered SoC-driven and/or application specific integrated circuit (ASIC)-driven technologies.

AES engines 40 and 60 are configured to obfuscate or conceal the current leakage information by decorrelating the data passed through their respective encryption and decryption datapaths from their respective power signatures using one or more of the techniques described in this disclosure. AES engine 40 is hybrid encryption/decryption engine configured to encrypt egress (or "Tx channel") data and decrypt ingress (or "Rx channel) data in an integrated silicon infrastructure. In some examples, control logic of AES engine 40 multiplexes parallel encryption and decryption datapaths on a round-by-round basis, and implements SCA-mitigation measures with respect to either (but not both) the encryption or decryption datapath. In other examples, control logic of AES engine 40 implements SCA-mitigation measures with respect to some (but not all) rounds of the encryption datapath and some (but not all) rounds of the decryption datapath. In this way, AES engine 40 randomly switches between executing SCA-protected AES rounds and executing non-SCA-protected AES rounds. By randomly switching between the SCA-protected AES rounds and non-SCA-protected AES rounds, AES engine 40 generates an overall power trace that mixes SCA-protected and non-SCA protected trace information, thereby scrambling the overall attack surface exposed by HMD 12 corresponding to both the encryption and decryption datapaths. AES engine 60 may perform similar operations to those described above with respect to AES engine 40, to scramble the overall attack surface exposed by peripheral device 6 corresponding to both the encryption and decryption datapaths.

AES engines 40 and 60 may implement various types of SCA-mitigation logic with respect to the SCA-protected datapaths, in accordance with the techniques of this disclosure. This disclosure primarily describes SCA-mitigation logic as being based on masking, as a non-limiting example for discussion. Aspects of using masking as an SCA-mitigation technique are discussed in U.S. patent application Ser. No. 16/721,701 filed on 19 Dec. 2019, the entire contents of which are incorporated herein by reference.

The SCA-prevention techniques of this disclosure take advantage of the power trace signature obfuscation effects of masking applied to 50% of the AES rounds, while extending the SCA-preventive effects of the masking to the remaining 50% of the AES rounds that are not executed on masked data. That is, because the masked AES rounds are randomly interleaved with unmasked AES rounds, the overall power trace signature exhibited by each of HMD 12 and peripheral device 6 is scrambled, thereby causing SCA hardware to perform SCAs with incorrect pre-processing data.

Because the masking is applied only to one of the two datapaths, the techniques of this disclosure provide SCA protection to both datapaths while explicitly expending computing resources for masking corresponding to only one datapath. That is, in instances in which AES engine 40 or AES engine 60 has Tx and Rx channel data available for processing at the same time, AES engine 40 or AES engine 60 provides SCA resistance to both datapaths while reducing compute resource expenditure by 50%. The masking-based implementations of the techniques of this disclosure can be implemented in digital logic, thereby providing SCA resistance to HMD 12 and/or peripheral device 6 without adding SCA-mitigation hardware, thereby maintaining the low-profile form factors of these devices.

FIG. 1B is an illustration depicting another example multi-device artificial reality system 20 that includes components configured to implement the SCA-prevention techniques of this disclosure. Similar to multi-device artificial reality system 10 of FIG. 1A, AES engine 40 of HMD SoC 2 included in HMD 12 and AES engine 60 of peripheral SoC 4 included in peripheral device 6 of FIG. 1B may multiplex masked and unmasked rounds of AES operations to scramble the attack surface exposed by HMD 12 and peripheral device 6 to SCA hardware. AES engines 40 and 60 of HMD SoC 2 and peripheral SoC 4 improve data security by obfuscating the power trace signatures output by HMD 12A and peripheral device 6 according to the random sequence (i.e. randomly multiplexed sequence) of masked and unmasked AES operations of this disclosure. AES engines 40 and 60 intermingle the operation of encryption and decryption rounds using the integrated hardware architecture of this disclosure while maintaining AES compliance for both encryption and decryption, and maintaining secure inter-SoC communication between HMD SoC 2 and peripheral SoC 4.

In the example of FIG. 1B, multi-device artificial reality system 20 includes external cameras 28A and 28B (collectively, "external cameras 28"), HMDs 12A-12C (collectively, "HMDs 12"), console 16, and sensors 26. As shown in FIG. 1B, multi-device artificial reality system 20 represents a multi-user environment in which an artificial reality application executing on console 16 and/or HMDs 12 presents artificial reality content to each of users 8A-8C (collectively, "users 8") based on a current viewing perspective of a corresponding frame of reference for the respective user 8. That is, in this example, the artificial reality application constructs artificial reality content by tracking and computing pose information for a frame of reference for each of HMDs 12. Multi-device artificial reality system 20 uses data received from external cameras 28 and/or HMDs 12 to capture 3D information within the real-world environment, such as motion by users 8 and/or tracking information with respect to users 8, for use in computing updated pose information for a corresponding frame of reference of HMDs 12.

HMDs 12 operate concurrently within multi-device artificial reality system 20. In the example of FIG. 1B, any of users 8 may be a "player" or "participant" in the artificial reality application, and any of users 8 may be a "spectator" or "observer" in the artificial reality application. HMDs 12 of FIG. 1B may each operate in a substantially similar way to HMD 12 of FIG. 1A. For example, HMD 12A may operate substantially similar to HMD 12 of FIG. 1A, and may receive user inputs by tracking movements of the hands of user 8A.

Each of HMDs 12 implements a respective user-facing artificial reality platform (or co-implements the platform with a co-processing device, as in the case of HMD 12A with peripheral device 6), and outputs respective artificial content, although only artificial reality content 22 output by HMD 12A is shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a goggle form factor and an eyeglass form factor. In some use case scenarios, HMDs 12B and/or 12C may also be paired (e.g. wirelessly coupled or tethered to) a portable device that implements generally corresponding features to those described with respect to peripheral device 6.

Figure 2A:
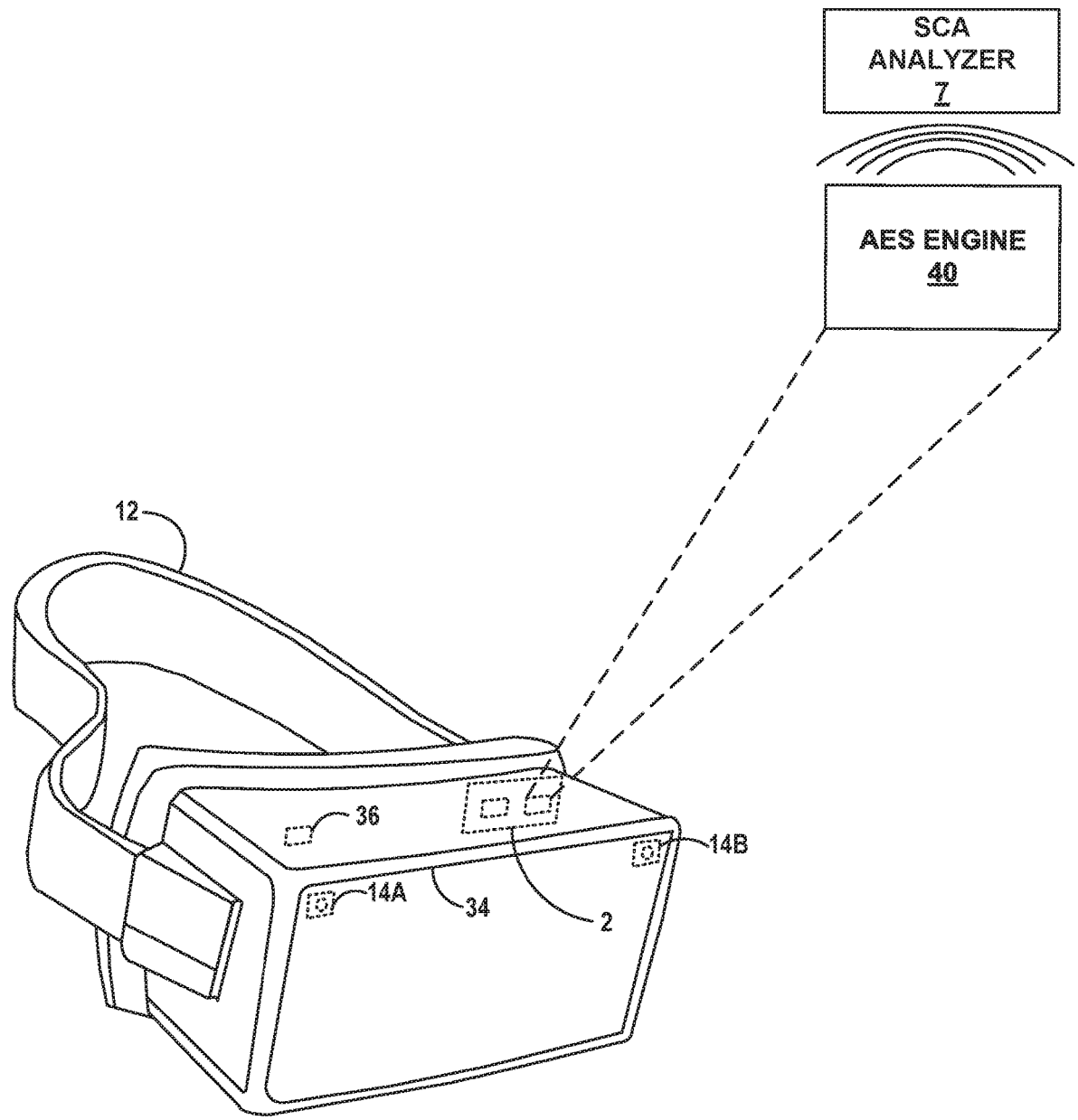
FIG. 2A is an illustration depicting an example HMD configured to encrypt input data before further processing/transmission, and to decrypt and render encrypted artificial reality content in an SCA-resistant manner in accordance with the techniques of the disclosure.

FIG. 2A is an illustration depicting an example HMD configured to encrypt input data before further processing/transmission, and to decrypt and render encrypted artificial reality content in an SCA-resistant manner in accordance with the techniques of the disclosure. HMD 12 of FIG. 2A may be an example of any of HMDs 12 of FIGS. 1A and 1. In some examples, HMD 12 may be part of an artificial reality system that incorporates other devices and network intermediaries, such as in the examples of multi-device artificial reality systems 10 and 20 illustrated in FIGS. 1A and 1. In other examples, HMD 12 may operate as a standalone, mobile artificial realty system configured to implement the SCA-thwarting techniques described herein. In the example of FIG. 2A, HMD 12 takes the general form factor of a headset or goggles.

In this example, HMD 12 includes a front rigid body and a band to secure HMD 12 to the wearer (e.g., user 8). In addition, HMD 12 includes an interior-facing electronic display 34 configured to present artificial reality content to user 8. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and user 8.

Figure 2B:
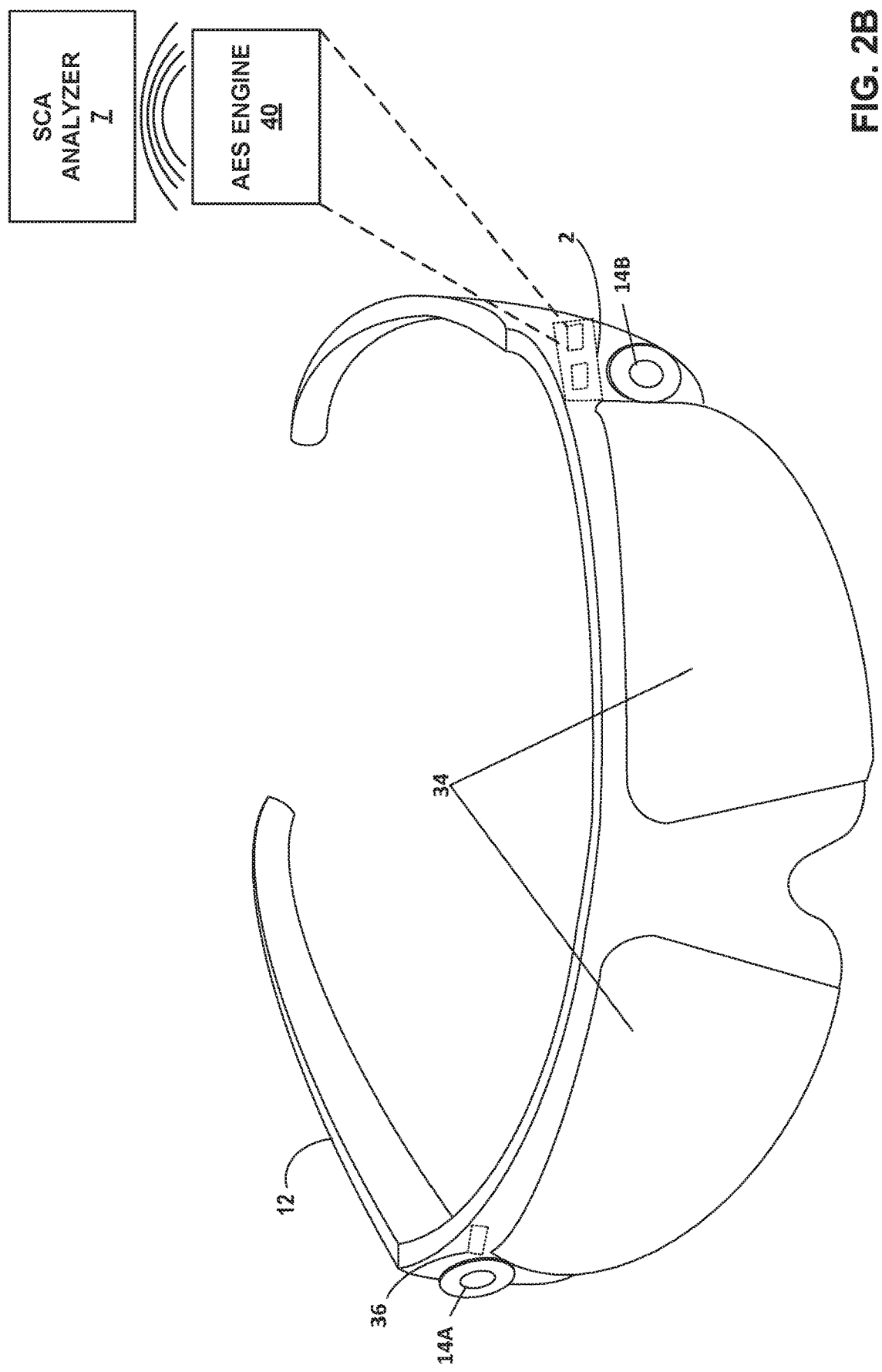
FIG. 2B is an illustration depicting another example of an HMD configured to encrypt input data, and to decrypt and render encrypted artificial reality content in an SCA-resistant manner in accordance with the techniques of the disclosure.

FIG. 2B is an illustration depicting another example of HMD 12 configured to encrypt input data, and to decrypt and render encrypted artificial reality content in an SCA-resistant manner in accordance with the techniques of the disclosure. HMD 12 of FIG. 2B may be an example of any of HMDs 12 of FIGS. 1A and 1B. HMD 12 may be part of an artificial reality system, such as artificial reality systems 10, 20 of FIGS. 1A, 1, or may operate as a standalone, mobile artificial realty system configured to implement the techniques described herein. In the example of FIG. 2B, HMD 12 takes the general form factor of glasses.

In this example, HMD 12 includes a front rigid body and two stems to secure HMD 12 to a user, e.g., by resting over the wearer's ears. Elements of FIG. 2B that share reference numerals with elements of FIG. 2A perform corresponding functionalities, and are not described separately with respect to FIG. 2B for the sake of brevity. In the example of FIG. 2B, electronic display 34 may be split into multiple segments, such as into two segments, with each segment corresponding to a separate lens disposed on the rigid front body of HMD 12. In other examples in accordance with FIG. 2B, electronic display 34 may form a contiguous surface that spans both lenses and the lens-connecting bridge (i.e., the over-the-nose portion) of the rigid front body of HMD 12. In some examples in accordance with the form factor illustrated in FIG. 2B, electronic display 34 may also encompass portions of HMD 12 that connect the lenses of the front rigid body to the stems, or optionally, portions of the stems themselves. These various designs of electronic display 34 in the context of the form factor of HMD 12 shown in FIG. 2B improve accessibility for users having different visual capabilities (e.g. with respect to peripheral vision and/or central vision, nearfield vision and/or distance vision, etc.), eye movement idiosyncrasies, etc.

In the examples illustrated in each of FIGS. 2A & 2B, HMD 12 further includes one or more motion sensors 36, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment.

In the examples illustrated in each of FIGS. 2A & 2B, HMD 12 includes integrated image capture devices 14A and 14B (collectively, "image capture devices 14"). Image capture devices 14 may include still image camera hardware, video camera hardware, laser scanners, Doppler® radar scanners, fundus photography hardware, infrared imaging cameras, depth scanners, or the like. Image capture devices 14 may include outward-facing and/or inward-facing image capture hardware, and include any hardware configured to capture image data representative of a surrounding physical environment, and optionally, to preprocess and/or post process the captured image data. Outward-facing camera hardware of image capture devices 14 may capture image data of the physical environment outside of HMD 12, such as, but not limited to, the real-world environment at which user 8 is positioned. Inward-facing camera hardware of image capture devices 14 may capture image data of the wearer of HMD 12, such as facial images and/or retina scans. Other inward-facing sensor hardware of HMD 12 may capture other types of information pertaining to the wearer, such as temperature information or other types of information or metrics.

HMD SoC 2 of HMD 12 includes AES engine 40, as described above with respect to FIGS. 1A & 1B. As also described above with respect to FIGS. 1A & 1B, AES engine 40 of HMD SoC 2 is configured to randomly switch between executing round(s) of an SCA-protected (e.g., masked) multi-round datapath and executing round(s) of a non-SCA-protected (e.g., unmasked) multi-round datapath in accordance with aspects of this disclosure. By multiplexing masked AES rounds against unmasked AES rounds, AES engine 40 causes HMD 12 to exhibit a randomized power trace signature that effectively decorrelates the power trace from the respective data-key pairs processed in the encryption and decryption pipelines. In this way, AES engine 40 expends the masking-related computing resources for one datapath, while extending the SCA-preventive benefits of the masking to two datapaths. As such, the configurations of this disclosure improve data security while mitigating the resource expenditure incurred by the data security improvement.

FIGS. 2A & 2B also illustrate SCA analyzer 7. SCA analyzer 7 represents an SCA board (e.g., an FPGA-based board or ASIC-based board), a so-called "skimmer," or any other device configured to snoop on the performance metrics of HMD 12. Hackers may use SCA analyzer 7 to implement various types of SCAs, such as a correlation power attack (CPA) or a direct memory access (DMA) attack. To perform a CPA, SCA analyzer 7 provides an input data set to HMD 12. A common example of a CPA involves providing one million test vectors that undergo encryption or decryption with a constant secret key, such as would be performed by an encryption engine that performs encryption operations to encrypt input data to form cipher text, or a decryption engine that performs decryption operations to decrypt cipher text. Various examples are described with respect to AES-compliant encryption and decryption, but it will be appreciated that the SCA-thwarting techniques of this disclosure are also applicable to encryption and decryption operations that conform to other standards or are not compliant to any present standard.

SCA analyzer 7 collects power traces of the AES-compliant system, and analyzes the current traces against a hypothesis that predicts the outcome for a given guess of the key. SCA analyzer 7 guesses the secret key (encryption key or decryption key, as the case may be) one byte at a time, thereby providing 256 possibilities for every byte. SCA analyzer 7 computes statistical correlation coefficients between the measured power traces and each hypothesis across all 256 candidate key bytes. SCA analyzer 7 selects the pairing that produces the highest correlation metric as the secret key guess. An important pre-processing step required for SCA analyzer 7 to compute the correlation metrics is to first align the power traces. By first aligning the power traces, SCA analyzer 7 ensures that the value of the power signature gleaned from different traces each correspond to a unique switching event in the AES-compliant SoC (or SoC configured in another, non-AES-compliant way, as the case may be).

SCA analyzer 7 forms the power trace correlations by relying on particular chronological sequences based on reverse engineering the AES-specified procedures to arrive at the cipher text-encryption key pair or the decryption key-decrypted output pair. According to configurations of this disclosure, AES engine 40 exploits the reliance of SCA analyzer 7 on the pre-processing step of aligning the power traces in order to generate the individual hypotheses corresponding to the unique power traces. AES engine 40 implements the SCA-thwarting techniques of this disclosure by disrupting the alignment operations that SCA analyzer 7 performs as a pre-processing step (or set of pre-processing steps) in the above-described CPA.

AES engine 40 implements the techniques described in this disclosure to obfuscate the overall power trace set collected by SCA analyzer 7, thereby disrupting the correlation between the power trace set and the target result of the SCAs performed. AES engine 40 is implemented in an integrated hardware infrastructure configured to execute both an encryption datapath and a decryption datapath, according to aspects of this disclosure. AES engine 40 applies an SCA-mitigation technique (e.g., masking) with respect to either the encryption datapath or the decryption datapath, but not both.

In accordance with the techniques of this disclosure, AES engine 40 multiplexes the encryption and decryption datapaths on a round-by-round basis, thereby generating a random sequence of encryption rounds and decryption rounds. Because one set of rounds is masked, the overall power trace signature exhibited by HMD 12 is interspersed with masked data, and thus, the individual power traces corresponding to the encryption and decryption datapaths are cross-obfuscated. AES engine 40 thereby provides SCA protection for both the encryption and decryption datapaths, while expending SCA protection logic for only one of the two datapaths. In this way, AES engine 40 improves data security with respect to HMD 12, while mitigating the logic overhead required for the data security improvements of this disclosure.

Figure 2C:
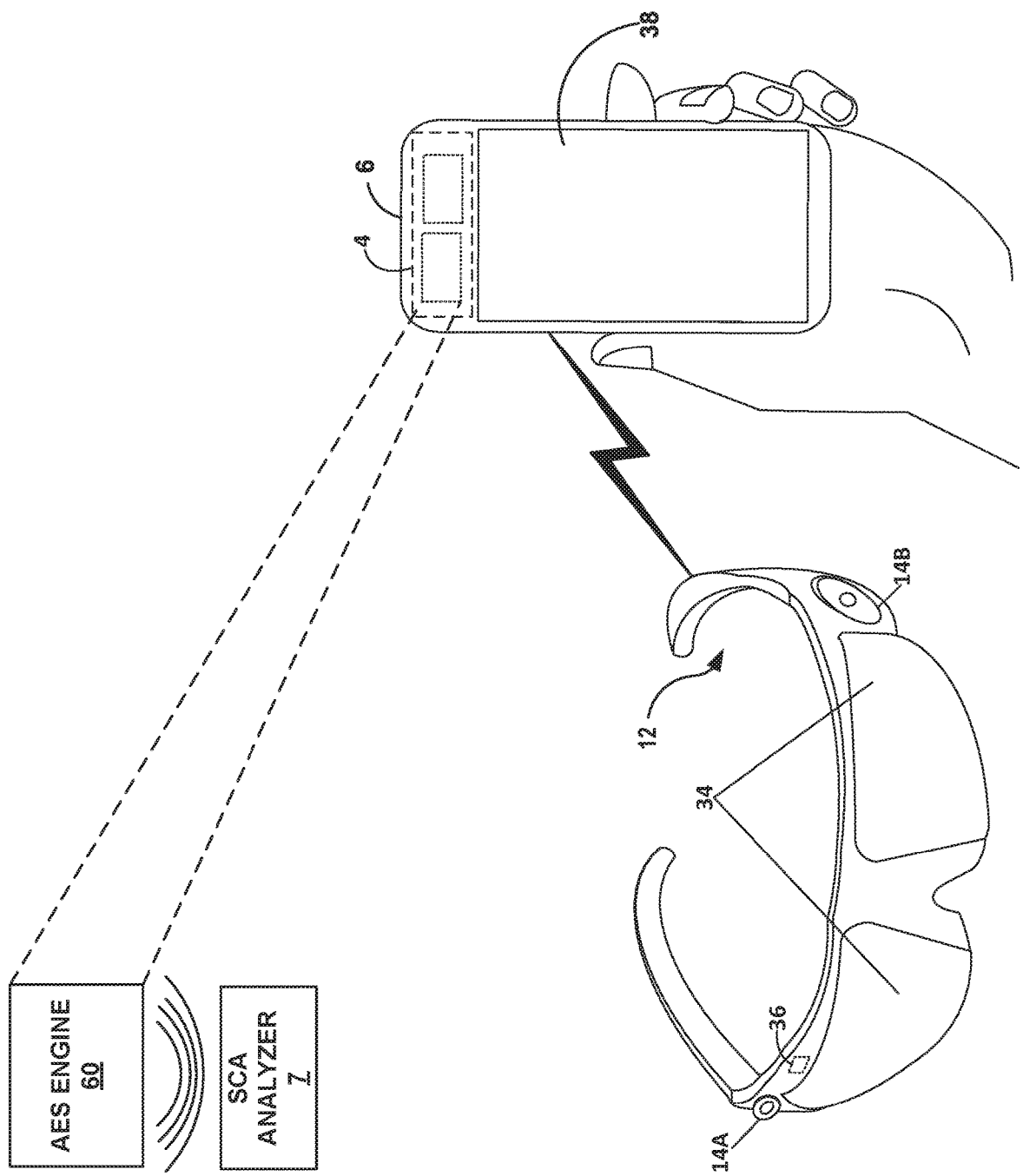
FIG. 2C is an illustration depicting an example of a peripheral device configured to encrypt input data, and to decrypt and render encrypted artificial reality content in an SCA-resistant manner in accordance with the techniques of the disclosure.

FIG. 2C is an illustration depicting an example of a peripheral device configured to encrypt input data, and to decrypt and render encrypted artificial reality content in an SCA-resistant manner in accordance with the techniques of the disclosure. Peripheral SoC 4 of peripheral device 6 performs one or more of the SCA-prevention techniques of this disclosure. HMD 12 of FIG. 2C may be an example of any of HMDs 12 of FIGS. 1A and 1, and takes the form factor of glasses, as in the case of HMD 12C of FIG. 1B and HMD 12 of FIG. 2B. In the example of FIG. 2C, image capture devices 14 may capture image data representative of various objects, including peripheral device 6 and/or of the hand(s) of user 8 in the physical environment that are within the FoV of image capture devices 14, which may generally correspond to the viewing perspective of HMD 12.

In the example of FIG. 2C, peripheral SoC 6 of peripheral device 6 includes AES engine 60 shown in FIGS. 1A & 1B. AES engine 60 represents an integrated silicon hardware unit configured to executing both encryption and decryption operations. In some examples, peripheral device 6 may receive encrypted data (e.g., streaming video data, etc.) over network 18, and may invoke decryption engine 63 to decrypt the encrypted data to be used in the generation and rendering of artificial reality content 22 for display on electronic display 34. As described above, peripheral SoC 4 and HMD SoC 2 generally communicate secure data in the form of crypto packet flows.

In some examples, peripheral device 6 may receive encrypted data from HMD 12 (e.g., encrypted facial images and/or retina scans of user 8, other authentication information, etc.), and may invoke AES engine 60 to decrypt the received cipher text for user authentication purposes. Peripheral device 6 may invoke AES engine 60 to encrypt data for various purposes, such as for encryption prior to transmission over network 18, prior to transmission to HMD 12, or for other purposes, as described above with respect to FIGS. 1A-2B.

Surface 38 of peripheral device 6 represents an input component or a combined input/output component of peripheral device 6. Surface 38 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 38 may enable peripheral device 6 to receive touch input or gesture input without direct contact with surface 38. User 8 may provide these touch or gesture inputs to peripheral device 6 to provide instructions directly to peripheral device 6, or indirectly to HMD 12 and/or other components of an artificial reality system in which HMD 12 is deployed. In some examples, processing circuitry of HMD 12 may utilize image capture devices 14 to analyze configurations, positions, movements, and/or orientations of peripheral device 6, of the hand(s) or digit(s) thereof of user 8 to enable to provide input using gestures such as drawing gestures or typing gestures provided via a graphical keyboard.

Peripheral device 6 can communicate data to and receive data from HMD 12 (e.g., egress and ingress crypto packet flows) using wireless communications links (e.g., Wi-Fi™, near-field communication of short-range wireless communication such as Bluetooth®, etc.), or using wired communication links, or combinations thereof, or using other types of communication links. In the example of FIG. 2C, peripheral device 6 is also communicatively coupled to network 18, thereby enabling peripheral device 6 to upload cipher text generated by AES engine 60 to securely communicate data to remote devices over network 18.

In this way, peripheral device 6 may offload various hardware and resource burdens from HMD 12, which enables low-profile form factor designs of HMD 12. Peripheral device 6 also serves as a communications intermediary between HMD 12 and devices at remote locations, via network 18. Further details of peripheral device 6 are described in U.S. patent application Ser. No. 16/506,618 (filed on 9 Jul. 2019), the entire content of which is incorporated herein by reference.

Peripheral SoC 4 supports various components, including AES engine 60 and other modules, elements, or operations described herein. In examples in which AES engine 60 is formed as an integrated circuit (IC), AES engine 60 represents an "encryption IC" as well as a "decryption IC." Inter-SoC communications between HMD SoC 2 and peripheral SoC 4 may be in the form of so-called "crypto packets" that include encrypted payloads and plain text headers. In these examples, HMD 12 may invoke AES engine 40 to encrypt the payloads before sending crypto packets to peripheral device 6, and may invoke AES engine 40 to decrypt encrypted payloads obtained from decapsulating crypto packets received from peripheral device 6. Correspondingly, peripheral device 6 may invoke AES engine 60 to encrypt the payloads before sending crypto packets to HMD 12, and may invoke AES engine 60 to decrypt encrypted payloads obtained from decapsulating crypto packets received from HMD 12.

In the example of FIG. 2C, SCA analyzer 7 attempts to perform a CPA against peripheral device 6. Again, SCA analyzer 7 performs CPAs by forming power trace correlations that rely on particular chronological sequences based on reverse engineering the AES-specified procedures to arrive at the cipher text-encryption key pair or the decryption key-decrypted output pair. According to configurations of this disclosure, AES engine 60 exploits the reliance of SCA analyzer 7 on the pre-processing step of aligning the power traces in order to generate the individual hypotheses corresponding to the unique power traces. AES engine 60 implements the SCA-thwarting techniques of this disclosure by disrupting the alignment operations that SCA analyzer 7 performs as a pre-processing step (or set of pre-processing steps) in the above-described CPA.

AES engine 60 implements the techniques described in this disclosure to obfuscate the overall power trace set collected by SCA analyzer 7, thereby disrupting the correlation between the power trace set and the target result of the SCAs performed. AES engine 60 is implemented in an integrated hardware infrastructure configured to execute both an encryption datapath and a decryption datapath, according to aspects of this disclosure. AES engine 60 applies an SCA-mitigation technique (e.g., masking) with respect to either the encryption datapath or the decryption datapath, but not both.

In accordance with the techniques of this disclosure, AES engine 60 multiplexes the encryption and decryption datapaths on a round-by-round basis, thereby generating a random sequence of encryption rounds and decryption rounds. Because one set of rounds is masked, the overall power trace signature exhibited by peripheral device 6 is interspersed with masked data, and thus, the individual power traces corresponding to the encryption and decryption datapaths are cross-obfuscated. AES engine 60 thereby provides SCA protection for both the encryption and decryption datapaths, while expending SCA protection logic for only one of the two datapaths. In this way, AES engine 60 improves data security with respect to peripheral device 6, while mitigating the logic overhead required for the data security improvements of this disclosure.

Figure 3:
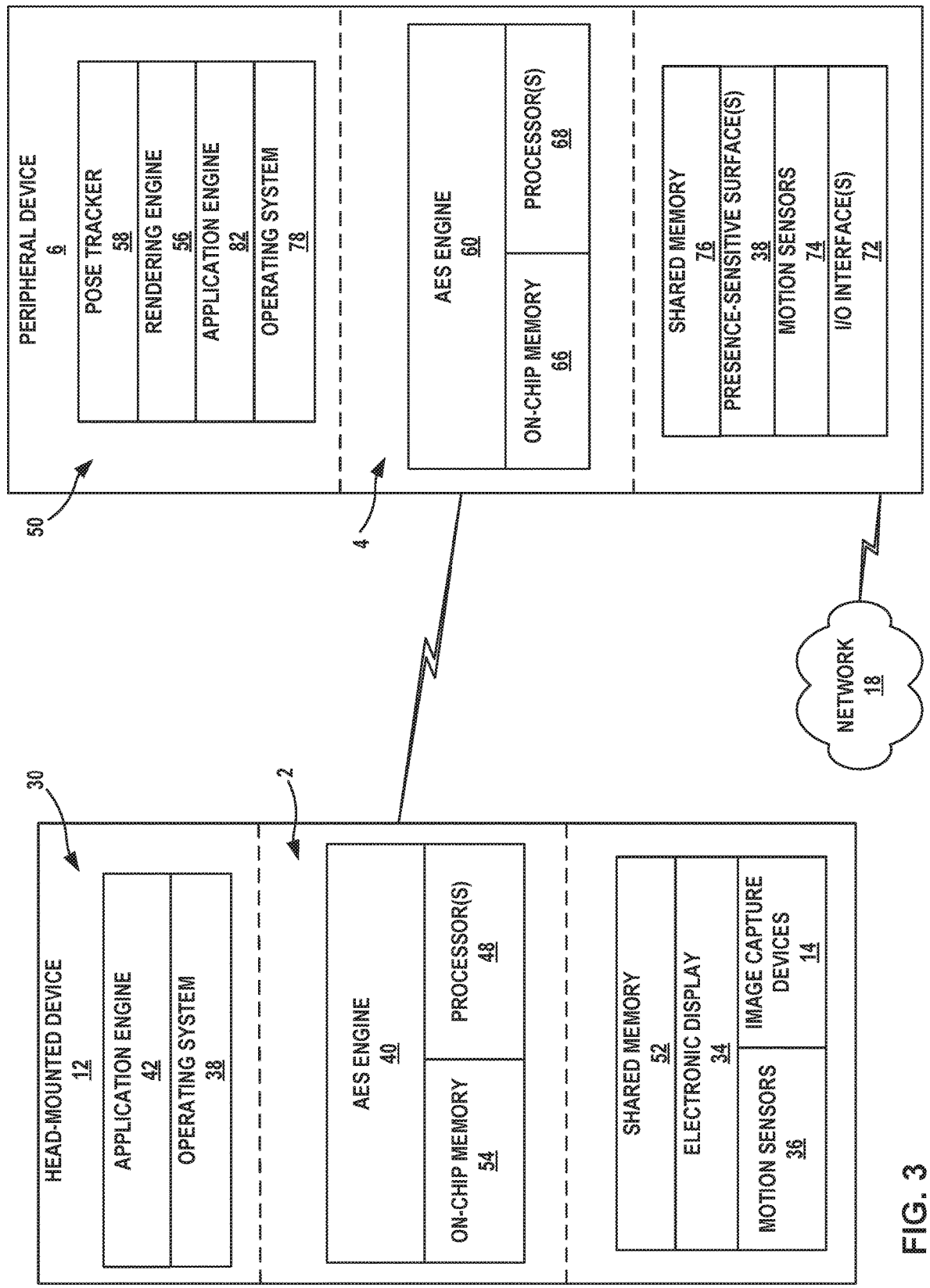
FIG. 3 is a block diagram showing example implementations of an HMD and a peripheral device of this disclosure.

FIG. 3 is a block diagram showing example implementations of HMD 12 and peripheral device 6. In this example, HMD SoC 2 of HMD 12 includes one or more processors 48 and memory 52, in addition to AES engine 40. While HMD SoC 2 is illustrated as incorporating AES engine 40, although it will be appreciated that HMD SoC 2 may, in other examples, incorporate components configured to implement encryption/decryption operations in accordance with standards other than the AES or in non-standard-compliant ways, in other examples within the scope of this disclosure.

Shared memory 52 and processor(s) 48 of HMD 12 may, in some examples, provide a computer platform for executing an operating system 38. Operating system 38 may represent an embedded, real-time multitasking operating system, for instance, or other type of operating system. In turn, operating system 38 provides a multitasking operating environment for executing one or more software components 30, including application engine 42.

Processor(s) 48 may be coupled to one or more of electronic display 34, motion sensors 36, and/or image capture devices 14. Processor(s) 48 are included in HMD SoC 2, which also includes on-chip memory 56. On-chip memory 54 is collocated with processor(s) 48 within a single integrated circuit denoted as HMD SoC 2 in the particular example shown in FIG. 3. Processor(s) 48 may use on-chip memory 54 as a temporary storage location for self-contained data processing performed within HMD SoC 2.

Processor(s) 48 and on-chip memory 54 may combine to implement scheduler 3, although scheduler 3 is illustrated as a standalone component of HMD SoC 2 purely for the purposes of ease of illustration and discussion.

HMD 12 is communicatively coupled to peripheral device 6, as shown in FIG. 3. Peripheral device 6 and HMD 12 function in tandem as co-processing devices to deliver the artificial reality experiences to user 8 as described above with respect to FIGS. 1A-2. Peripheral device 6 may offload portions of the computing tasks otherwise performed by HMD 12, thereby enabling a reduced hardware infrastructure and therefore a lower-profile form factor with respect to the design of HMD 12.

Peripheral device 6 includes presence-sensitive surface 38 (described above with respect to FIG. 2), as well as input/output (I/O) interface(s) 72, and motion sensors 74. Peripheral device 6 may invoke I/O interface(s) 72 to send and receive data over network 18, such as cipher text or plain text (unencrypted) data. I/O interface(s) 72 may also incorporate hardware that enables peripheral device 6 to communicate wirelessly with HMD 12. Peripheral device 6 may invoke motion sensors 74 to detect and track motion by user 8 for use in computing updated pose information for a corresponding frame of reference of HMD 12.

Peripheral SoC 4 of peripheral device 6 includes AES engine 60, on-chip memory 66, and one or more processors 68. On-chip memory 66 represents memory collocated with processor(s) 68 within a single integrated circuit denoted as peripheral SoC 4 in the particular example shown in FIG. 3. Processor(s) 68 may use on-chip memory 66 as a temporary storage location for self-contained data processing performed within peripheral SoC 4. While peripheral SoC 4 is shown in FIG. 3 as incorporating AES engine 60, it will be appreciated that peripheral SoC 4 may include components configured to implement encryption/decryption operations in accordance with standards other than the AES or in non-standard-compliant ways, in other examples within the scope of this disclosure.

Shared memory 76 and processor(s) 68 of peripheral device 6 provide a computer platform for executing an operating system 78. Operating system 78 may represent an embedded, real-time multitasking operating system, for instance, or other type of operating system. In turn, operating system 78 provides a multitasking operating environment for executing one or more software components 50. Apart from operating system 78, software components 50 include an application engine 82, a rendering engine 56, and a pose tracker 58. In some examples, software components 50 may not include rendering engine 56, and HMD 12 may perform the rendering functionalities without co-processing with peripheral device 6.

In general, application engine 82, when invoked, provides functionality to provide and present an artificial reality application, e.g., a teleconference application, a gaming application, a navigation application, an educational application, a training application, a simulation application, or the like, to user 8 via HMD 12. Application engine 82 may include, for example, one or more software packages, software libraries, hardware drivers, and/or Application Program Interfaces (APIs) for implementing an artificial reality application. Responsive to control by application engine 82, rendering engine 56 generates artificial reality content 22 (e.g., incorporating 3D artificial reality content) for display to user 8 by application engine 42 of HMD 12.

Application engine 82 and rendering engine 56 construct artificial reality content 22 for display to user 8 in accordance with current pose information for a frame of reference, typically a viewing perspective of HMD 12, as determined by pose tracker 58. Based on the current viewing perspective as determined by pose tracker 58, rendering engine 56 constructs artificial reality content 22 (e.g., 3D artificial content) which may in some cases be overlaid, at least in part, upon the real-world 3D environment of user 8. During this process, pose tracker 58 operates on sensed data received from HMD 12, such as movement information and user commands, and, in some examples, data from any external sensors 26 (shown in FIGS. 1A & 1B), to capture 3D information within the real-world environment, such as motion by user 8 and/or feature tracking information with respect to user 8. Based on the sensed data, pose tracker 58 determines a current pose for the frame of reference of HMD 12 and, in accordance with the current pose, constructs artificial reality content 22 for communication, via one or more I/O interfaces 72, to HMD 12 for display to user 8.

While HMD 12 and peripheral device 6 may communicate on a number of levels, FIG. 3 is primarily described with respect to communications at the level represented by HMD SoC 2 and peripheral SoC 4. Processor(s) 48 include a security processor of HMD SoC 2, and processor(s) 68 include a security processor of peripheral SoC 4. Processor(s) 48 and processor(s) 68 invoke AES engines 40 and 60, respectively, to encrypt transmission (Tx) channel data, which represents outgoing data with a destination of the other SoC. The respective traversal path of each crypto packet is described by a "channel ID", which is unique to a {source subsystem, destination subsystem} tuple. The source subsystem identifies a discrete subsystem of the originating SoC, and the destination subsystem identifies a discrete subsystem of the destination SoC.

Processor(s) 48 and processor(s) 68 are configured to select the encryption key to be applied by AES engines 40 and 60 respectively, for a given data segment based on the channel ID of the crypto packet that will be formed using the data segment undergoing encryption. Similarly, processor(s) 48 and processor(s) 68 may select the corresponding decryption keys to be applied by AES engines 40 and 60 respectively to decrypt a decapsulated encrypted payload based on the channel ID of the ingress crypto packet that carried the payload. In this way, processor(s) 48 and processor(s) 68 use multi-key encryption and decryption with keys varying on a channel ID-unique basis.

Each of processors 48 and 68 may comprise any one or more of a multi-core processor, a controller, a digital signal processor (DSP), an application specific integrated circuit (ASIC), a field-programmable gate array (FPGA), processing circuitry (e.g., fixed-function circuitry or programmable circuitry or any combination thereof) or equivalent discrete or integrated logic circuitry. Any one or more of shared memory 52, shared memory 76, on-chip memory 54, or on-chip memory 66 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), or flash memory.

AES engines 40 and 60 are configured to protect the data-key pairs under encryption/decryption from surreptitious discovery via CPAs, in accordance with aspects of this disclosure. AES engines 40 and 60 exploit the reliance of SCA hardware (e.g., SCA analyzer 7) on the pre-processing step of aligning power traces gathered from within close range of HMD 12 or peripheral device 6 in order to generate individual hypotheses corresponding to the unique power traces. AES engines 40 and 60 disrupt the alignment operations that SCA analyzer 7 performs as a pre-processing step (or set of pre-processing steps) of a CPA by scrambling the overall attack surface exposed by HMD 12 and peripheral device 6 according to the techniques of this disclosure.

In some examples, each of AES engines 40 and 60 applies an SCA-mitigation technique (e.g., masking) with respect to a true subset (i.e. some but not all) of the rounds of the respective encryption datapath, and applies the SCA-mitigation technique to a true subset (i.e. some but not all) of the rounds of the respective decryption datapath. For example, if the encryption key is more valuable (longer life) than the decryption key (shorter life, more ephemeral), then AES engine 40 or 60 may allocate a greater number of SCA-protected rounds can be allocated to the encryption datapath (and vice versa in other use case scenarios). As another example, if the raw data under encryption data is more valuable (e.g., static user data such as biometric information) than the cipher text under decryption (e.g. generic media), then AES engine 40 or 60 may allocate a greater number of SCA-protected rounds to the encryption datapath (and vice versa in other use case scenarios).

In other examples, each of AES engines 40 and 60 applies an SCA-mitigation technique (e.g., masking) with respect to either the encryption datapath or the decryption datapath, but not both. In accordance with the techniques of this disclosure, AES engines 40 and 60 multiplex the encryption and decryption datapaths on a round-by-round basis, thereby generating a random sequence of encryption rounds and decryption rounds. Because one set of rounds is masked and interleaved with unmasked rounds, the overall power trace signatures exhibited by HMD 12 and peripheral device 6 are interspersed with masked data. The individual power traces corresponding to the encryption datapath and the decryption datapath are thereby cross-obfuscated. In this way, each of AES engines 40 and 60 provides SCA protection for both encryption and decryption datapaths, while expending masking-related resources for only one of the two datapaths. In this way, AES engines 40 and 60 improve data security with respect to HMD 12 and peripheral device 6, while mitigating the logic overhead required for the data security improvements of this disclosure.

In some examples, control logic of AES engines 40 and 60 randomly select which of the two datapaths is to be masked. In other examples, respective applications of software components 30 and 50 may select the datapath to be masked based on the sensitivity of the data being encrypted or decrypted. For instance, software components 30 and 50 may prioritize crypto packet flows carrying biometric data (e.g., iris scans) for masking over a concurrently processed crypto packet flow carrying other types of information.

While primarily described herein with respect to the example of multiplexing a masked datapath against an unmasked datapath, AES engines 40 and 60 may be configured to multiplex masked rounds against unmasked rounds in different ways as well, in accordance with aspects of this disclosure. In some examples, AES engines 40 and 60 mask a subset of encryption datapath rounds while leaving the remaining encryption rounds unmasked, and mask a subset of decryption datapath rounds while leaving the remaining decryption rounds unmasked. The subset ratios may vary in different implementations, such as 50% masking for each of the encryption and decryption datapaths, 60% masking for the encryption datapath and 40% masking for the decryption datapath, and so on.

In instances in which each datapath features ten rounds, these configurations produce ten rounds with SCA protection activated, and ten rounds without SCA protection activated. In the 50% example above, AES engine 40 or 60 may execute the encryption datapath using five SCA-protected rounds and five non-SCA-protected rounds, and may execute the decryption datapath using five SCA-protected rounds and five non-SCA-protected rounds. In these examples, AES engines 40 and 60 multiplex the encryption rounds against the decryption rounds in the manner described above, producing an overall power trace signature that is obfuscated by way of the masked subsets of rounds being interspersed throughout the power trace signature.

Figure 4:
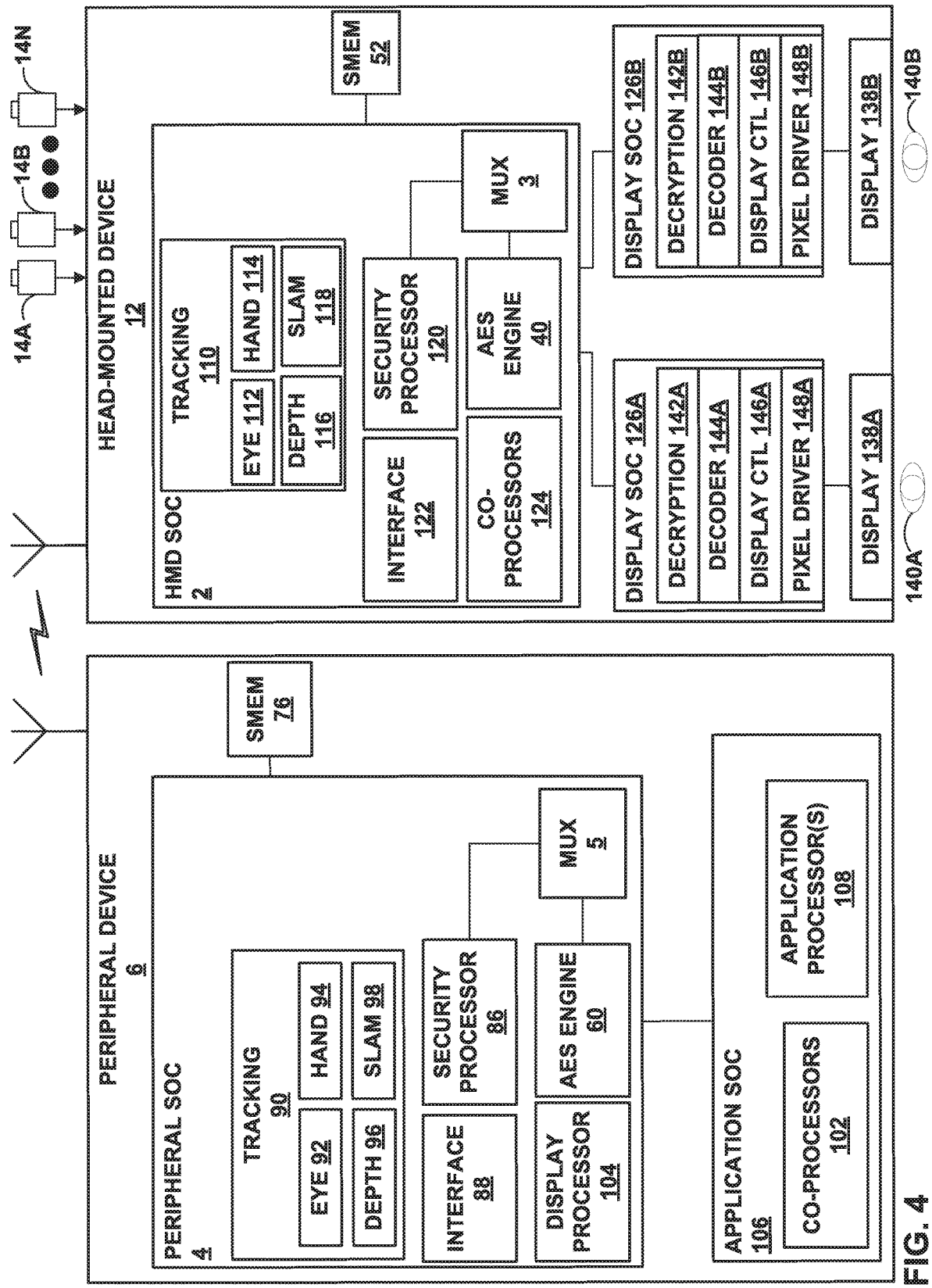
FIG. 4 is a block diagram illustrating a more detailed example implementation of a distributed architecture for a multi-device artificial reality system in which two or more devices are implemented using one or more system on a chip (SoC) integrated circuits within each device.

FIG. 4 is a block diagram illustrating a more detailed example implementation of a distributed architecture for a portion of multi-device artificial reality systems 10 and 20, in which two or more devices are implemented using respective SoC integrated circuits within each device. FIG. 4 illustrates an example in which HMD 12 operating in conjunction with peripheral device 6. Again, peripheral device 6 represents a physical, real-world device having a surface on which multi-device artificial reality systems 10 or 20 overlay virtual content. Peripheral device 6 includes one or more presence-sensitive surface(s) 38 for detecting user inputs by detecting a presence of one or more objects (e.g., fingers, stylus, etc.) touching or hovering over locations of presence-sensitive surfaces) 38.

In some examples, peripheral device 6 may have a form factor similar to any of a smartphone, a tablet computer, a personal digital assistant (PDA), or other hand-held device. In other examples, peripheral device 6 may have the form factor of a smartwatch, a so-called "smart ring," or other wearable device. Peripheral device 6 may also be part of a kiosk or other stationary or mobile system. Presence-sensitive surface(s) 38 may incorporate output components, such as display device(s) for outputting visual content to a screen. As described above, HMD 12 is architected and configured to enable the execution of artificial reality applications.

Each of HMD SoC 2, peripheral SoC 4, and the other SoCs illustrated in FIG. 4 represent specialized integrated circuits arranged in a distributed architecture, where each SoC integrated circuit includes various specialized functional blocks configured to provide an operating environment for artificial reality applications. FIG. 4 is merely one example arrangement of SoC integrated circuits that peripheral device 6 and HMD 12. The distributed architecture for multi-device artificial reality systems 10 and 20 may include any collection and/or arrangement of SoC integrated circuits.

In the example of FIG. 4, HMD SoC 2 of HMD 12 comprises functional blocks including tracking 110, security processor 120, interface 122, co-processors 124, and AES engine 40. AES engine 40 include encryption engine 44 and decryption engine 46 implemented separately in silicon. Tracking 110 provides a functional block for eye tracking 112 ("eye 112"), hand tracking 114 ("hand 114"), depth tracking 116 ("depth 116"), and Simultaneous Localization and Mapping (SLAM) 118 ("SLAM 118").

For example, HMD 12 may receive input from one or more accelerometers (e.g., quantities represented in inertial measurement units or "IMUs") that output data indicative of current acceleration of HMD 12, GPS sensors that output data indicative of a location of HMD 12, radar or sonar that output data indicative of distances of HMD 12 from various objects, or other sensors that provide indications of a location or orientation of HMD 12 or other objects within a physical environment. HMD 12 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 6 and/or hand and/or the eyes of user 8) in the physical environment that are within a field of view of image capture devices, which typically corresponds with the viewing perspective of HMD 12 or the inward-facing view of HMD 12. Based on a portion of the sensed data and/or a portion of the image data, tracking 110 determines, for example, a current pose for the frame of reference of HMD 12 and, in accordance with the current pose, renders the artificial reality content. As described above with respect to FIGS. 1A-3, AES engine 40 is a functional block configured to encrypt Tx channel data communicated to peripheral device 6 and to decrypt Rx channel data communicated from peripheral device 6 or other system.

Application co-processors 124 include various processors such as a video processing unit, graphics processing unit (GPU), digital signal processors (DSPs), encoders and/or decoders, and/or others. In accordance with the techniques described in this disclosure, all or portion(s) of a backend shell may be implemented in hardware, software, or a combination of hardware and software. For example, the backend shell of a concurrent application engine may be executed on co-application processors 124. A plurality of artificial reality applications may be concurrently executed on co-application processors 124, in some examples.

Display SoCs 126A and 126B each represent display controllers for outputting artificial reality content on respective displays, e.g., displays 138A, 138B (collectively, "displays 138"). In this example, display SoC 126A may include a display controller for display 138A to output artificial reality content for a left eye 140A of user 8. In the example of FIG. 4, display SoC 126A includes a decryption block 142A, a decoder block 144A, a display controller 146A, and a pixel driver 148A for outputting artificial reality content on display 138A. Similarly, display SoC 126B includes a display controller for display 138B to output artificial reality content for a right eye 140B of user 8. In the example of FIG. 4, display SoC 126B includes a decryption unit 142B, a decoder 144B, a display controller 146B, and/or a pixel driver 148B for generating and outputting artificial reality content on display 138B. Displays 138 may include any one or more of light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality content 22.

Peripheral device 6 includes peripheral SoC 4 and application SOC 106 configured to support an artificial reality application. In this example, peripheral SoC 4 comprises functional blocks including AES engine 40, interface 88, tracking 90, security processor 86, and display processor 104. Tracking 90 is a functional block providing eye tracking 92 ("eye 92"), hand tracking 94 ("hand 94"), depth tracking 96 ("depth 96"), and/or simultaneous localization and mapping (SLAM) 98 ("SLAM 98").

For example, peripheral device 6 may receive input from one or more accelerometers (quantified in IMUs) that output data indicative of current acceleration of peripheral device 6, GPS sensors that output data indicative of a location of peripheral device 6, radar or sonar that output data indicative of distances of peripheral device 6 from various objects, or other sensors that provide indications of a location or orientation of peripheral device 6 or other objects within a physical environment. Peripheral device 6 may in some examples also receive image data from one or more image capture devices, such as still cameras, video cameras, laser scanners, Doppler® radar scanners, depth scanners, or the like, configured to output image data representative of the physical environment. Based on the sensed data and/or image data, tracking block 90 determines, for example, a current pose for the frame of reference of peripheral device 6 and, in accordance with the current pose, renders the artificial reality content to HMD 12.

AES engine 60 includes encryption engine 62 and decryption engine 64, implemented separately in silicon. As such, AES engine 60 is a functional block configured to encrypt Tx channel data communicated to HMD 12 and to decrypt Rx channel data communicated from HMD 12. In various examples, AES engine 60 may support symmetric key cryptography to encrypt/decrypt data using a session key (e.g., a secret symmetric key). Display processor 104 includes one or more processors such as a video processing unit, graphics processing unit, encoders and/or decoders, and/or others, for rendering artificial reality content to HMD 12.

Interface 88 includes one or more interfaces for connecting to functional blocks of HMD SoC 4. As one example, interface 88 may include peripheral component interconnect express (PCIe) slots. HMD SoC 4 may connect with application SoC 106 using interface 88. HMD SoC 4 may connect with one or more communication devices (e.g., radio transmitter) using interface 88 for communicating with other devices, such as HMD 12. Security processor 86 provides secure device attestation and mutual authentication of when pairing peripheral device 6 with devices, e.g., HMD 12, used in conjunction within the artificial reality environment. Security processor 86 may authenticate application SoC 106 of peripheral device 6.

Application SoC 106 includes application co-processors 102 and application processors 108. In this example, co-application processors 102 include various processors, such as a vision processing unit (VPU), a graphics processing unit (GPU), and/or central processing unit (CPU). Application processors 108 may include a processing unit for executing one or more artificial reality applications to generate and render, for example, a virtual user interface to a surface of peripheral device 6 and/or to detect gestures performed by user 8 with respect to peripheral device 6.

In the example of FIG. 4, HMD SoC 2 includes multiplexer (MUX) 3, and peripheral SoC 4 includes MUX 5. MUXes 3 and 5 may be implemented within respective security processors 120 and 86, may form a portion of control logic of respective AES engines 40 and 60, or may be implemented in other ways. According to aspects of this disclosure, MUXes 3 and 5 are configured to multiplex masked rounds against unmasked rounds executed by AES engines 40 and 60, respectively. In this way, MUXes 3 and 5 enable AES engines 40 and 60 to randomly switch between executing masked AES rounds and unmasked AES rounds, to obfuscate the overall power trace signatures exhibited by HMD 12 and peripheral device 6. The obfuscated power trace signatures scramble the attack surfaces exposed by HMD 12 and peripheral device 6 to SCA analyzer 7. In this way, HMD SoC 2 and peripheral SoC 4 implement the techniques of this disclosure to improve data security while limiting the masking-related resource consumption to a subset (50% in some examples) of the overall set of AES rounds executed by AES engines 40 and 60.

Figure 5:
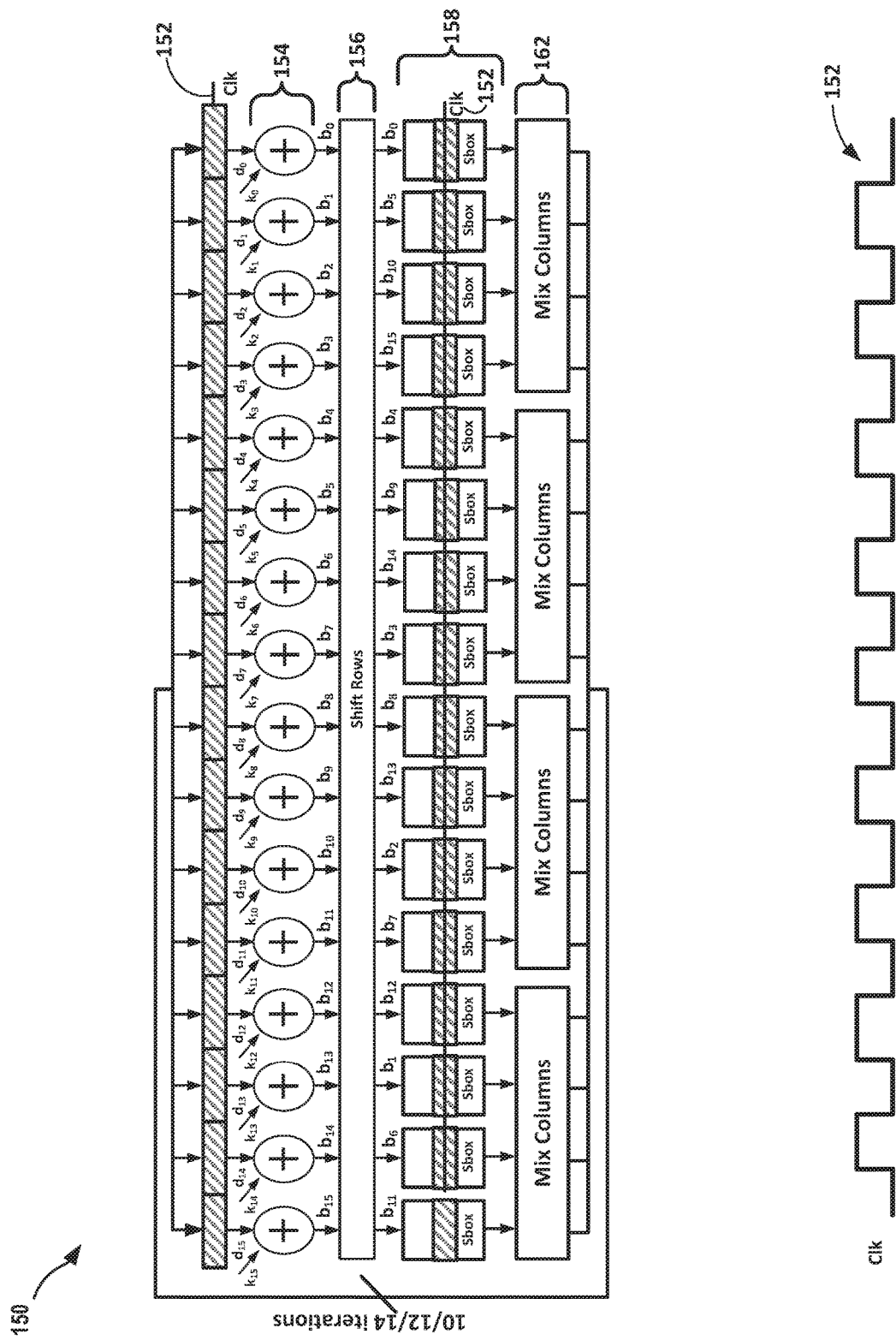
FIG. 5 is a conceptual diagram illustrating an example of an AES-compliant encryption or decryption datapath.

FIG. 5 is a conceptual diagram illustrating an example of an AES-compliant encryption or decryption datapath. The process and structure illustrated in FIG. 5 is referred to herein as AES round datapath 150. An AES-compliant encryption engine may implement AES round datapath 150 to decrypt an input block of cipher text, by performing inverse operations with respect to a reciprocal encryption datapath that generates cipher text from unencrypted input data. Various aspects of AES round datapath 150 operate according to master clock 152. The clock rate of master clock 152 is described as being at a "full frequency" in the implementation illustrated in FIG. 5 to provide maximum decryption throughput with respect to decryption datapath 150. According to AES round datapath 150, a 16-byte (128-bit) encrypted input is provided, on a per-byte basis, to sixteen adder units as part of "add round key" step 154. In add round key step 154, each byte of the data input is added to a decryption key obtained using Rijndael's key schedule. Each input byte-key pair is shown in FIG. 5 using a "d-k" notation, using subscripts to delineate the different input bytes and the different decryption keys.

The sixteen output bytes (denoted using a "b" notation with unique subscripts) of add round key step 154 are then shifted cyclically by various offsets in a shift rows step 156. The shift rows step 156 cyclically shifts the bytes in each row by a certain offset determined for that particular row. In the shift rows step 156, the first row is left unchanged, each byte of the second row is right-shifted by an offset of one, each byte of the third row is right-shifted by an offset of two, and each byte of the fourth row is right-shifted by an offset of three. Thus, each column of the output data from shift rows step 156 includes shifted data from a column of the input data. The right-shifting operations described with respect to shift rows step 156 are generally reciprocal to left-shifting operations that are performed by a reciprocal AES-compliant encryption datapath.

The structure of the data output by the shift rows step 156 does not permit for independently operating on separate segments of the original 16-byte input, because data produced from four different block ciphers may be included in each four-byte run of the data output by the shift rows step 156. The shift rows step 156 is an iterative process that is performed in multiple passes, which, in the particular example of FIG. 5, is a ten-iteration step.

Each respective output byte of the shift rows step 156 is then passed through a respective inverse substitute byte (inverse Sbox) unit as part of inverse byte substitution computational stage 158. Decryption datapath 150 implements inverse byte substitution computational stage 158 by inverting a lookup table (LUT)-based substitution as a deciphering operation performed on the encrypted input data. In the reciprocal byte substitution step of an encryption datapath, each byte in the array output by a shift rows step is replaced with a substitute byte obtained using a LUT, which is also sometimes referred to as an 8-bit substitution box. Inverse byte substitution computational stage 158 addresses non-linearity in the cipher code received as input for AES round datapath 150.

The byte-substituted outputs of the sixteen inverse Sbox units are then provided to an array of mix columns units for performance of mix columns step 162. AES round datapath 150 includes four mix columns units, each of which receives, as input, the outputs of four contiguous inverse Sbox units. As such, each mix columns unit processes a four-byte input as part of mix columns step 162. In mix columns step 162, each mix columns unit combines the respective four-byte input using an invertible linear transformation. Each mix columns unit receives a four-byte input, and produces a four-byte output. Each four-byte input received by a respective mix columns unit is sometimes referred to as a respective "column" in the context of during mix columns step 162. Each mix columns unit of AES round datapath 150 processes the respective input column using matrix multiplication such that every single input byte affects all four output bytes. In a reciprocal encryption process, the combination of the reciprocal shift rows step and mix columns step provides diffusion in the cipher operation set.

An encryption datapath corresponding to decryption datapath 150 accepts a 16-byte (128-bit) block of unencrypted data, and adds encryption key segments (the encryption key being obtained using Rijndael's key schedule) to the unencrypted input, on a byte-by-byte basis during the corresponding "add round key" step. In a corresponding Sbox stage, the encryption datapath employs Sbox units, instead of inverse Sbox units described with respect to the decryption operations described above with respect to AES round datapath 150. Purely for the sake of brevity, a separate AES encryption datapath is not illustrated in the accompanying drawings, in light of the structural parallels between the AES-compliant encryption datapath and the decryption-based AES round datapath 150 of FIG. 5.

Figure 6:
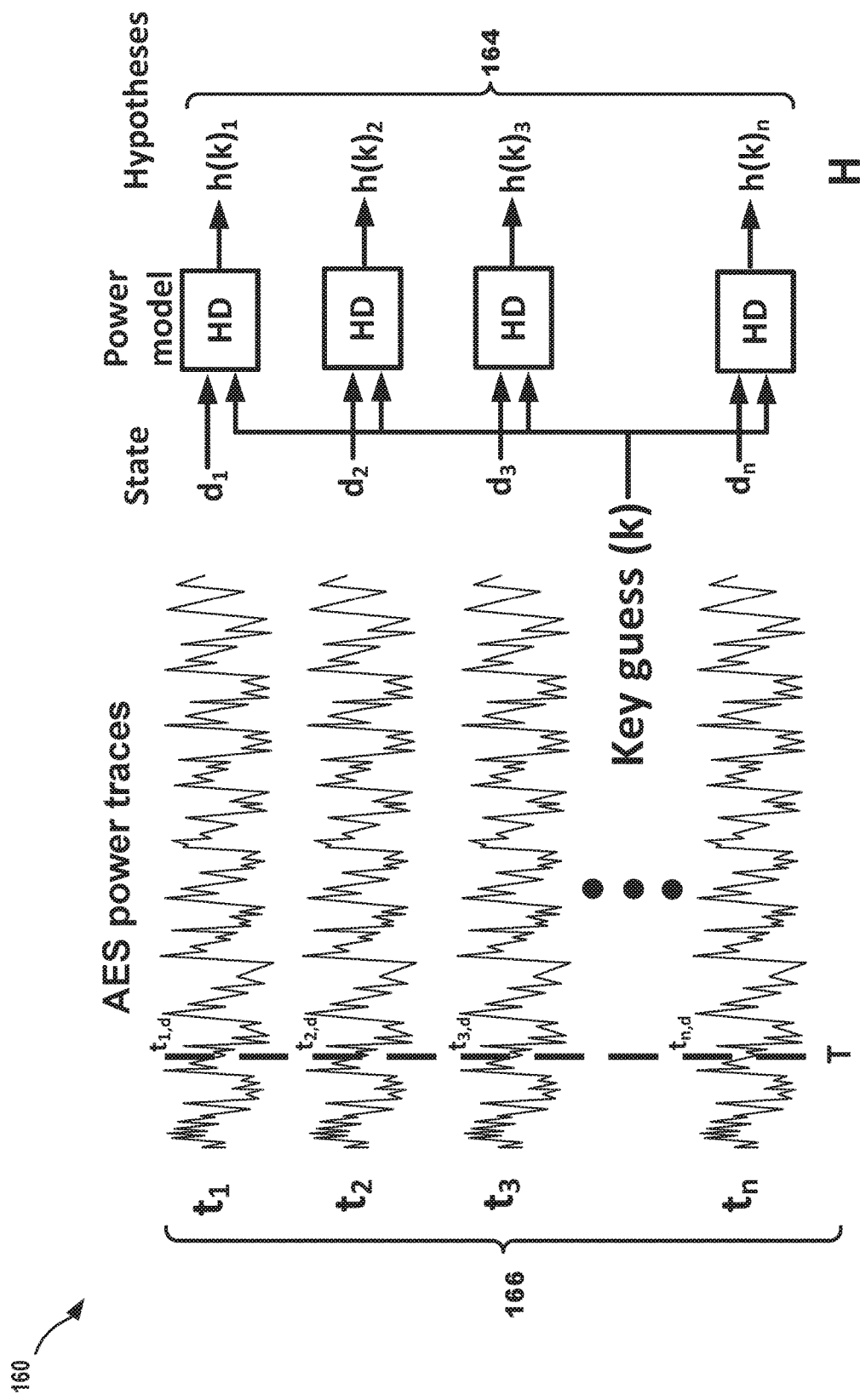
FIG. 6 is a conceptual diagram illustrating aspects of a correlation power attack (CPA).

FIG. 6 is a conceptual diagram illustrating aspects of a correlation power attack (CPA) 160. CPA 160 represents an attack that SCA analyzer 7 may perform. CPA 160 is described as an attack that SCA analyzer 7 performs with respect to a decryption datapath, as an example. SCA analyzer 7 may also perform CPA 160 with respect to encryption datapaths. SCA analyzer 7 may provide a number of sixteen-byte test inputs to AES engine 40 or AES engine 60, and snoop on the power traces exhibited by the device (e.g., HMID 12 or peripheral device 6) that implements the decryption datapath while decrypting the test inputs. For example, SCA analyzer 7 may provide one million test vectors in carrying out CPA 160.

SCA analyzer 7 maintains timestamps for the input times of the various test inputs to AES engine 40 or AES engine 60. The timestamps that SCA analyzer 7 maintains for the full set of test inputs is illustrated in FIG. 6 as $t_1$ through $t_n$, where the subscript 'n' denotes the overall number of text inputs provided by SCA analyzer 7 (which is a value of one million in the case of many common SCA models). The underlying datasets of the respective test inputs are illustrated in FIG. 6 as $d_1$ through $d_n$. Using the respective timestamp t and the respective dataset d of a particular test input, SCA analyzer 7 conducts AES power traces 166. Again, because the AES is a publicly-available standard, potential hackers can configure SCA analyzer 7 to predict, for known input data, the expected power trace information relatively accurately.

Using datasets $d_1$ through $d_n$, SCA analyzer 7 generates key hypotheses $h(k)_1$ through $h(k)_n$ (collectively, hypotheses 164). That is, SCA analyzer 7 feeds datasets $d_1$ through $d_n$ into a key generation model. In the example of CPA 160, SCA analyzer 7 uses a hardware distance (HD) model to generate hypotheses 164 from datasets $d_1$ through $d_n$. SCA analyzer 7 also skims power traces 166 while each respective dataset d is processed by AES engine 40 or AES engine 60. Because the data of each dataset d and the input time t of each dataset d is known to SCA analyzer 7, SCA analyzer 7 can match or determine likenesses between each AES power trace 166 and each of the 256 (calculated as 2^8 based on the 8-bit input) possible hypotheses 164.

The overall convergence of test inputs is denoted as 'T' in FIG. 6, and the overall convergence of hypotheses 164 is denoted as 'H'. SCA analyzer 7 uses the correlation of T and H (denoted as correlation (T, H)) to predict the decryption key being applied in an AES-defined decryption process. In terms of key prediction, the particular hypothesis 164 that yields the highest correlation (T, H) value tends to be correct key guess in terms of the decryption key being applied in the decryption process. In some notations, the correlation (T, H) value is expressed as a prediction operation R(k), and the correct key guess of the decryption key is the greatest R(k) value obtained from the iterative power trace-to-predicted key comparison operation. That is, the particular hypothesis 164 that maximizes the value of R(k) within the universe of AES power traces 166 tends to be the correct key guess with respect to the AES-decryption process illustrated in FIG. 5 by way of AES round datapath 150.

Figure 7:
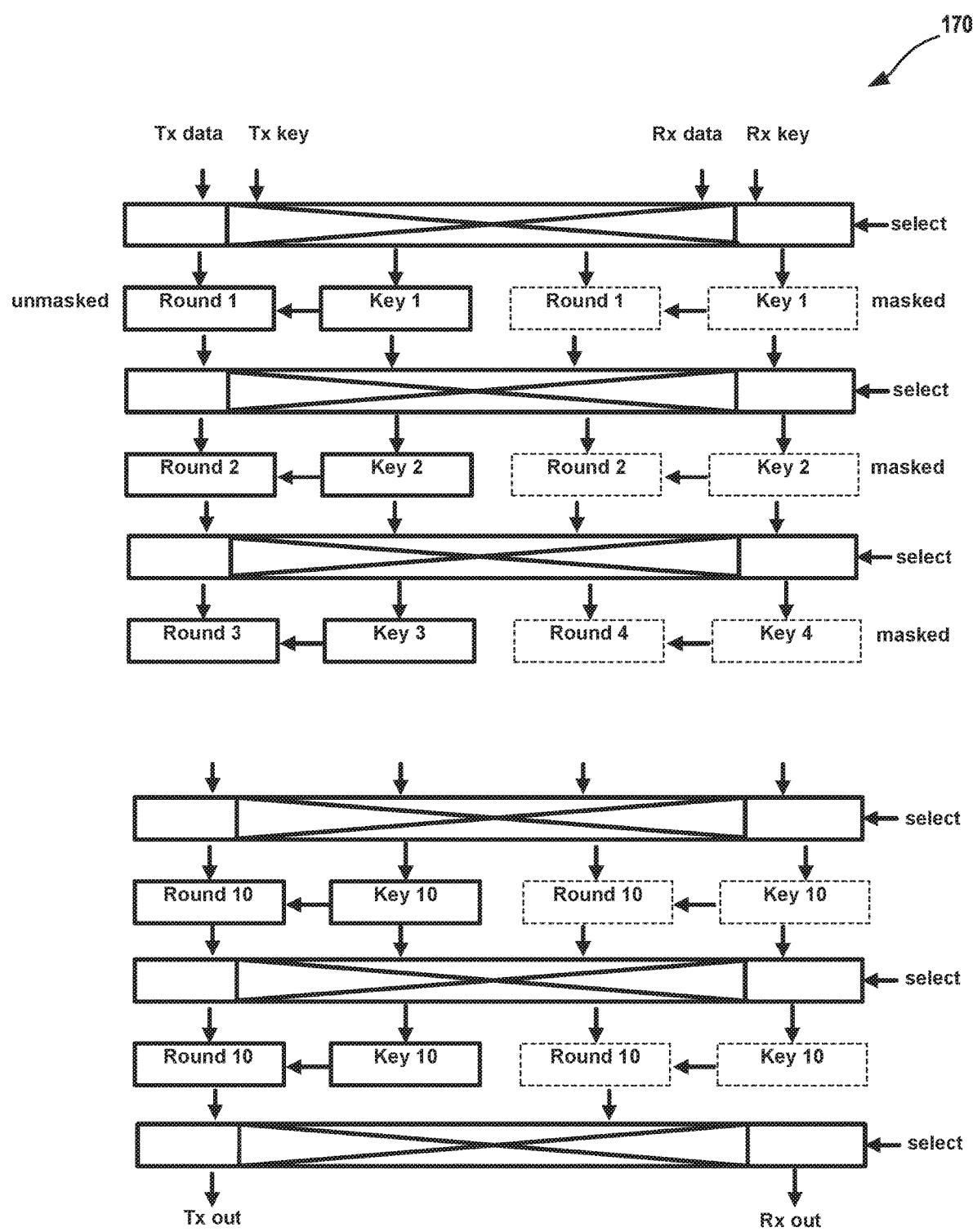
FIG. 7 is a diagram illustrating an integrated encryption-decryption operation set multiplexed on a per-round basis that engines of this disclosure may perform, in accordance with aspects of this disclosure.

FIG. 7 is a diagram illustrating datapath 170 that represents an integrated encryption-decryption operation set multiplexed on a per-round basis that AES engine 40 or AES engine 60 may perform, in accordance with aspects of this disclosure. In the particular example of FIG. 7, AES engine 40 or AES engine 60 applies SCA-protective masking to the entirety of the decryption datapath applied to Rx channel data. MUXes 3 and 5 provide selection inputs (labeled "select") to enable random, pseudo-random, or deterministic selection between a masked decryption round and an unmasked encryption round. The base encryption key applied to the Tx channel data of FIG. 7 is labeled as a Tx key, and the base decryption key applied to the Rx channel data of FIG. 7 is labeled as an Rx key. Datapath 170 corresponds to ten-round encryption and ten-round decryption as applied to 128-bit input data segments in accordance with the AES. However, it will be appreciated that the random round-switching techniques of this disclosure are also applicable to AES encryption and decryption as applied to input data segments with sizes other than 128 bits, as well.

Figure 8:
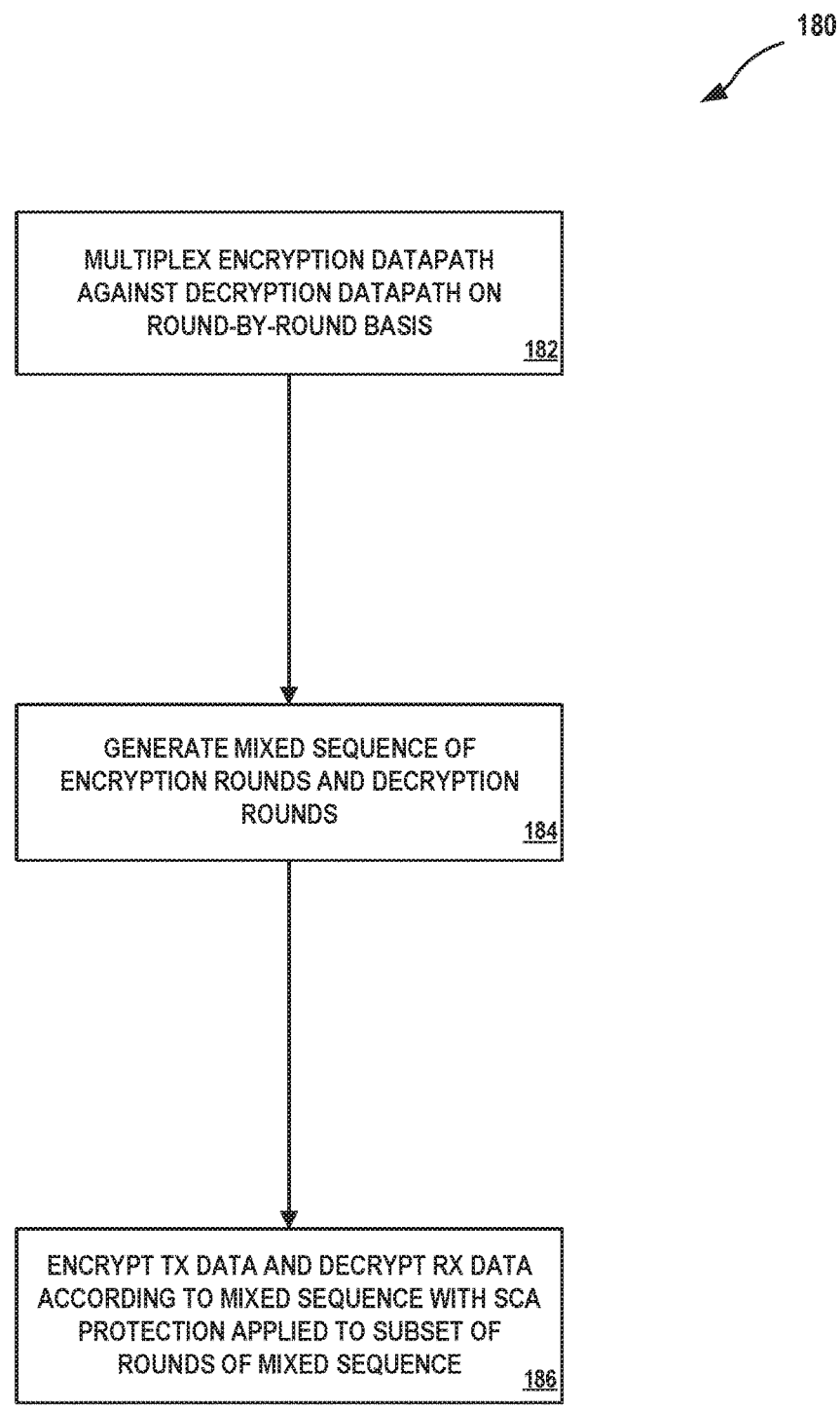
FIG. 8 is a flowchart illustrating another example process that an HMD SoC or a peripheral SoC may perform to prevent SCAs, in accordance with aspects of this disclosure.

FIG. 8 is a flowchart illustrating an example process 180 that HMD SoC 2 or peripheral SoC 4 may perform to prevent SCAs, in accordance with aspects of this disclosure. Process 180 is described as being performed by HMD SoC 2 and components thereof as a non-limiting example, and it will be appreciated that peripheral SoC 4 (and components thereof) may perform process 180 as well. Security processor 120 invokes MUX 3 to multiplex the encryption datapath implemented by AES engine 40 against the decryption datapath implemented by AES engine 40 on a round-by-round basis (182). For example, security processor 120 may provide a varied sequence of selection inputs to MUX 3 to generate a mixed sequence of encryption rounds and decryption rounds. Security processor 120 may provide the sequence of selection inputs in such a way as to generate a random, pseudo-random, or deterministic ordering with respect to the mixed sequence of encryption rounds and decryption rounds. Again, AES engine 40 executes the encryption rounds of the encryption datapath with respect to Tx channel data and executes the decryption rounds of the decryption datapath with respect to Rx channel data.

By using MUX 3 to multiplex the encryption datapath against the decryption datapath on a round-by-round basis using a varied series of selection inputs, security processor 120 generates a mixed sequence (e.g., a random, pseudo-random, or deterministic sequence) of encryption rounds and decryption rounds (184). Security processor 120 may control AES engine 40 to encrypt the Tx channel data and decrypt the Rx channel data according to the random sequence of encryption rounds and decryption rounds, with SCA protection applied to a subset of the overall rounds of the mixed sequence (186). As described above, security processor 120 may select the subset of rounds to be SCA-protected in various ways, such as by selecting only one of the encryption or decryption datapath, selecting respective subsets of encryption and decryption rounds, etc.

In some examples, if security processor 120 determines that AES engine 40 only has access to data on one channel (Tx or Rx, but not both), security processor 120 may control AES engine 40 apply SCA protection to all of the rounds for processing (encrypting or decrypting, as the case may be) the data on the single data-available channel, or may cause AES engine 40 to hold the data until data becomes available on the presently inactive channel. While described in this disclosure as being performed by security processor 120 as an example, it will be appreciated that, in other examples, other logic of HMD SoC 2 may generate the mixed sequence of encryption rounds and decryption rounds. In some examples, HMD SoC 2 may include scheduler logic configured to generate the mixed sequence of encryption rounds and decryption rounds by providing the varied series of selection inputs to MUX 3.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMID) connected to a host computer system, a standalone HMID, a mobile device or computing system, or any other hardware platform capable of providing artificial reality content to one or more viewers.

What is claimed is:

1. A system on a chip (SoC) comprising:
an encryption/decryption engine configured to:
encrypt transmission (Tx) channel data using a multi-round encryption datapath; and
decrypt encrypted received (Rx) channel data using a multi-round decryption datapath; and
a security processor configured to:
multiplex the multi-round encryption datapath against the multi-round decryption datapath on a round-by-round basis to generate a mixed sequence of encryption rounds and decryption rounds; and
control the encryption/decryption engine to encrypt the Tx channel data and decrypt the encrypted Rx channel data according to the mixed sequence of encryption rounds and decryption rounds;
apply side-channel attack (SCA) protection while executing a subset of the rounds of the mixed sequence; and
not applying the SCA protection while executing all remaining rounds of the mixed sequence not included in the subset;
wherein the remaining rounds of the mixed sequence not included in the subset and executed while the SCA protection is not applied comprise all remaining encryption rounds of the mixed sequence not included in the subset of encryption rounds of the mixed sequence to which the SCA protection is applied and all remaining decryption rounds of the mixed sequence not included in the subset of decryption rounds of the mixed sequence and executed while the SCA protection is applied.

2. The SoC of claim 1,
wherein the subset of rounds of the mixed sequence executed while the SCA protection is applied comprises each encryption round of the mixed sequence, and
wherein the remaining rounds of the mixed sequence not included in the subset and executed while the SCA protection is not applied comprise each decryption round of the mixed sequence.

3. The SoC of claim 1,
wherein the subset of rounds of the mixed sequence executed while the SCA protection is applied comprises each decryption round of the mixed sequence, and
wherein the remaining rounds of the mixed sequence not included in the subset and executed without applying the SCA protection comprise each encryption round of the mixed sequence.

4. The SoC of claim 1,
wherein the subset of rounds of the mixed sequence executed while the SCA protection is applied comprises a combination of a subset of the encryption rounds of the mixed sequence with a subset of the decryption rounds of the mixed sequence.

5. The SoC of claim 1, wherein the SCA protection comprises masking using a random number.

6. The SoC of claim 1, wherein the SoC is integrated into one of a head-mounted device (HMD) of an artificial reality system or a peripheral device of the artificial reality system.

7. The system on a chip (SoC) of claim 1, wherein the security processor is further configured to control the encryption/decryption engine to encrypt the Tx channel data and decrypt the encrypted Rx channel data according to the mixed sequence of encryption rounds and decryption rounds such that the subset of rounds of the multi-round encryption datapath are interleaved with a subset of rounds of the multi-round decryption datapath.

8. The system on a chip (SoC) of claim 7, wherein the subset of rounds of the multi-round encryption datapath are interleaved with a subset of rounds of the multi-round decryption datapath on one of a random basis, a pseudo-random basis, or a deterministic basis.

9. A head-mounted device (HMD) comprising:
a system on a chip (SoC) comprising:
an encryption/decryption engine configured to:
encrypt transmission (Tx) channel data using a multi-round encryption datapath; and
decrypt encrypted received (Rx) channel data using a multi-round decryption datapath; and
a security processor configured to:
multiplex the multi-round encryption datapath against the multi-round decryption datapath on a round-by-round basis to generate a mixed sequence of encryption rounds and decryption rounds; and
control the encryption/decryption engine to encrypt the Tx channel data and decrypt the encrypted Rx channel data according to the mixed sequence of encryption rounds and decryption rounds;
apply side-channel attack (SCA) protection while executing a subset of the rounds of the mixed sequence; and
not applying the SCA protection while executing all remaining rounds of the mixed sequence not included in the subset;
wherein the remaining rounds of the mixed sequence not included in the subset and executed while the SCA protection is not applied comprise all remaining encryption rounds of the mixed sequence not included in the subset of encryption rounds of the mixed sequence to which the SCA protection is applied and all remaining decryption rounds of the mixed sequence not included in the subset of decryption rounds of the mixed sequence and executed while the SCA protection is applied; and an interface coupled to the SoC, the interface being configured to:
transmit the Tx traffic; and
receive the encrypted Rx traffic.

10. The HMD of claim 9,
wherein the subset of rounds of the mixed sequence executed while the SCA protection is applied comprises each encryption round of the mixed sequence, and
wherein the remaining rounds of the mixed sequence not included in the subset and executed while the SCA protection is not applied comprise each decryption round of the mixed sequence.

11. The HMD of claim 9,
wherein the subset of rounds of the mixed sequence executed while the SCA protection is applied comprises each decryption round of the mixed sequence, and
wherein the remaining rounds of the mixed sequence not included in the subset and executed without applying the SCA protection comprise each encryption round of the mixed sequence.

12. The HMD of claim 9,
wherein the subset of rounds of the mixed sequence executed while the SCA protection is applied comprises a combination of a subset of the encryption rounds of the mixed sequence with a subset of the decryption rounds of the mixed sequence.

13. The HMD of claim 9, wherein the SCA protection comprises masking using a random number.

14. The HMD of claim 9,
wherein the encryption rounds form a multi-round encryption datapath,
wherein a respective result of each encryption round is used by a subsequently executed encryption round of the multi-round encryption datapath,
wherein the decryption rounds form a multi-round decryption datapath, and
wherein a respective result of each decryption round is used by a subsequently executed decryption round of the multi-round decryption datapath.

15. A peripheral device comprising:
a system on a chip (SoC) comprising: a system on a chip (SoC) comprising:
an encryption/decryption engine configured to:
encrypt transmission (Tx) channel data using a multi-round encryption datapath; and
decrypt encrypted received (Rx) channel data using a multi-round decryption datapath; and
a security processor configured to:
multiplex the multi-round encryption datapath against the multi-round decryption datapath on a round-by-round basis to generate a mixed sequence of encryption rounds and decryption rounds; and
control the encryption/decryption engine to encrypt the Tx channel data and decrypt the encrypted Rx channel data according to the mixed sequence of encryption rounds and decryption rounds;
apply side-channel attack (SCA) protection while executing a subset of the rounds of the mixed sequence; and
not applying the SCA protection while executing all remaining rounds of the mixed sequence not included in the subset;
wherein the remaining rounds of the mixed sequence not included in the subset and executed while the SCA protection is not applied comprise all remaining encryption rounds of the mixed sequence not included in the subset of encryption rounds of the mixed sequence to which the SCA protection is applied and all remaining decryption rounds of the mixed sequence not included in the subset of decryption rounds of the mixed sequence and executed while the SCA protection is applied; and
an interface coupled to the SoC, the interface being configured to:
transmit the Tx traffic; and
receive the encrypted Rx traffic.

16. The peripheral device of claim 15,
wherein the subset of rounds of the mixed sequence executed while the SCA protection is applied comprises each encryption round of the mixed sequence, and
wherein the remaining rounds of the mixed sequence not included in the subset and executed while the SCA protection is not applied comprise each decryption round of the mixed sequence.

17. The peripheral device of claim 15,
wherein the subset of rounds of the mixed sequence executed while the SCA protection is applied comprises each decryption round of the mixed sequence, and
wherein the remaining rounds of the mixed sequence not included in the subset and executed without applying the SCA protection comprise each encryption round of the mixed sequence.

18. The peripheral device of claim 15,
wherein the subset of rounds of the mixed sequence executed while the SCA protection is applied comprises a combination of a subset of the encryption rounds of the mixed sequence with a subset of the decryption rounds of the mixed sequence.

19. The peripheral device of claim 15, wherein the SCA protection comprises masking using a random number.

20. The peripheral device of claim 15,
wherein the encryption rounds form a multi-round encryption datapath,
wherein a respective result of each encryption round is used by a subsequently executed encryption round of the multi-round encryption datapath,
wherein the decryption rounds form a multi-round decryption datapath, and wherein a respective result of each decryption round is used by a subsequently executed decryption round of the multi-round decryption datapath.

* * * * *